(12) United States Patent
Wang et al.

(10) Patent No.: US 9,969,386 B1
(45) Date of Patent: May 15, 2018

(54) VEHICLE AUTOMATED PARKING SYSTEM AND METHOD

(71) Applicant: Mitsubishi Electric Research Laboratories, Inc., Cambridge, MA (US)

(72) Inventors: Yebin Wang, Acton, MA (US); Devesh Jha, Brighton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days. days.

(21) Appl. No.: 15/402,353

(22) Filed: Jan. 10, 2017

(51) Int. Cl.
*B60W 30/06* (2006.01)
*B62D 15/02* (2006.01)

(52) U.S. Cl.
CPC ......... *B60W 30/06* (2013.01); *B62D 15/0285* (2013.01); *B60W 2510/207* (2013.01); *B60W 2550/10* (2013.01); *B60W 2710/20* (2013.01)

(58) Field of Classification Search
CPC .................... B60W 30/06; B62D 15/0285
See application file for complete search history.

(56) References Cited

U.S. PATENT DOCUMENTS

| 7,737,866 | B2 | 6/2010 | Wu et al. |
| 8,497,782 | B2 * | 7/2013 | Barth ................. B62D 15/0285 |
| | | | 180/204 |
| 8,862,321 | B2 | 10/2014 | Moshchuck et al. |
| 2016/0200359 | A1 | 7/2016 | Boeck et al. |

FOREIGN PATENT DOCUMENTS

CN     105857306 A     8/2016

* cited by examiner

*Primary Examiner* — Basil T. Jos
(74) *Attorney, Agent, or Firm* — Gene Vinokur; James McAleenan; Hironori Tsukamoto

(57) ABSTRACT

A method and a system for an automated parking determines, using the geometry of the vehicle and the map of the parking space, a collision free geometric path connecting an initial state of the vehicle with a target state of parked vehicle through a set of waypoints and determines, using a kinematic model of the vehicle, a set of kinematic subgraphs forming a kinematic graph having multiple nodes connected with kinematic edges. Each waypoint defines a position and orientation of the vehicle, each kinematic subgraph connects a pair of neighboring waypoints of the geometric path, each node defines a state of the vehicle, and each kinematic edge connecting two nodes defines a collision free kinematic path connecting the two nodes according to kinematics of the vehicle. A kinematic path is selected form the kinematic graph and a reference trajectory tracking the kinematic path as a function of time is determined using a dynamic model of the vehicle. The motion of the vehicle is according to the reference trajectory.

20 Claims, 34 Drawing Sheets

VEHICLE AUTOMATED PARKING SYSTEM AND METHOD

TECHNICAL FIELD

This invention relates generally to path planning for vehicles, and more particularly to path planning methods for automatically parking a vehicle into a target space.

BACKGROUND

Several control systems employed by vehicles, either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

One of the tasks for controlling the autonomous or semi-autonomous vehicles executing in autonomous-driving mode automatically parks a vehicle into a parked position and orientation referred herein as a target state. The parking task can be formulated as the following. Given vehicle dynamics, a map of the parking space, an initial state representing the vehicle's start position and orientation, and a target state representing the vehicle's target parked position and orientation, determine a desired path or motion of the vehicle from the initial state to the target state and then control the actuators of the vehicle, e.g., vehicle's gas pedal and steering wheel, to ensure that the vehicle follows the desired path or motion. However, due to nonholonomic constraints on the motion of the vehicle and a typically narrow free space in the parking space, such as a parking garage or a parking lot, path planning for automatically parking a vehicle is challenging.

Most existing path planning solutions only cope with specific parking scenarios, or assume specific geometry of the parking space. For instance, a method described in U.S. Pat. No. 7,737,866 calculates paths for parallel parking and back-in parking. The method described in U.S. Pat. No. 8,497,782 assumes a special structure of the parking path, ignores obstacles, and calculates a path based on a specific geometry of the parking space. Also, the method described in U.S. Pat. No. 8,862,321 addresses parallel parking and requires the initial state of the vehicle to be within a so-called feasible starting region from which pre-coded parallel parking maneuvers is initiated. Although achieve real-time path generation, aforementioned methods restrict, more or less, the types of obstacles, the geometry of the parking space, and parking tasks, and fail to consider general parking scenarios.

Accordingly, there is a need for a system and a method for automatically parking a vehicle into a target space suitable for variety of real-life parking scenarios.

SUMMARY

It is an object of some embodiments to disclose a path planning method that allows real-time path generation for the vehicle automated parking system and method. It is another object of some embodiments to provide such a method that reduce the computational cost of the path planning caused by specifics of the automatic parking for variety of real-life parking scenarios in the tight parking spaces.

Some embodiments are based on understanding that sampling-based path planning method can be used to find a desired path through a parking space having an arbitrarily layout. However, some embodiments are based on recognition that an application of sampling-based path planning methods such as a rapid-exploring random tree (RRT) method and its variants, to the automated parking problem can result in a number of wasted computations making this task computationally impractical. In a general parking scenario, the parking spot is located relatively far from the initial, e.g., current, position of a vehicle. In addition, due to the tight free space and complicated map of the parking space, such as space of a parking garage or a parking lot, the path to the parking spot can have different forms and shapes. To that end, in order to find such a path, the entire parking space may need to be sampled and tested for the path feasibility. As a result, the straightforward application of the sampling-based path planning method can unnecessarily sample all unexplored state space resulting in an impractical solution for real-time parking applications.

Some embodiments are based on recognition that the parking problem can be solved using at least two stages. At the first stage, the kinematic path connecting the initial with the target state of the vehicle is constructed. At the second stage, the actual trajectory following the kinematic path is determined. Such an approach is advantageous because the kinematic path can be constructed using the kinematic model, which is simpler that the dynamic model of the vehicle.

The two stage problem partition can reformulate the original parking problem into the following. Given geometry of the vehicle, maps of the parking space, and a kinematic model of the vehicle, find a feasible, collision free path, referred herein as kinematic path, connecting the initial state to the target state. Kinematic feasibility ensures that the kinematic path is a solution of the vehicle kinematics with the initial state as its initial value, and thus can be followed by the vehicle starting from the initial state. A collision free property guarantees that the vehicle does not collide with obstacles in a parking space while moving along the kinematic path.

Despite the fact that kinematic model is usually simpler that the dynamic model of the vehicle, when the entire parking space needs to be sampled and tested for kinematic feasibility of the kinematic path, the solution for automated parking problem still can be computationally impractical. Compared with path planning for vehicle highway driving, path planning for vehicle automated parking systems has unique characteristics: the collision free space in the environment is typically very tight, which requires sampling based methods explore the parking space at much slower pace. As a result, it is more challenging to construct a kinematic path connecting two states through the collision free space.

In addition, some embodiments are based on a general understanding that the sampling problem for the entire parking space can be partitioned into a set of planning sub-problems. For example, it is possible to start building the kinematic graphs from both the initial and the target states and/or to partition the parking space into a set of subspaces. However, a random partitioning may not increase computational efficiency and may result in a fragmental and/or infeasible kinematic path.

Some embodiments are based on recognition that the sampling of the parking space problem needs to be partitioned into a set of sub-problems such that the solution of each sub-problem can be connected to determine the feasible kinematic path connecting the initial and the target states. In addition, the partitioning into the set of sub-problems should provide guidance on how to sample the partitioned states of the parking space. This is because in a general sampling problem, a sampled state has a low probability to be close and added to the kinematic tree built in the parking space due to relatively great distance between the initial and target states. This low probability means the computation taken to determine the proximity to the kinematic trees is more likely wasted. To avoid wasting computation in the detection of the proximity, a sampled state, though far from both trees, can be treated as a neighbor of the kinematic trees. Such a treatment however increases wasted computation in collision detection stage. This is because when a distant sampled state treated as a neighbor to the kinematic tree, the probability of having collision free connections between the sampled state and the kinematic tree is low. Any computation applied to detect low probability events is most likely wasted and thus incurs low computation efficiency.

Some embodiments are based on realization that a collision free geometric path connecting an initial state of the vehicle with a target state of parked vehicle through a set of waypoints can be used to partition the sampling problem into a set of sub-problems for building the kinematic path, which can increase the computational efficiency of the sampling and provide a feasible kinematic path.

The geometric path can be built using only geometry of the vehicle and a map of the parking space, i.e., without consideration of the kinematic or dynamic model of the vehicle. In such a manner, the computation of the geometric path is simplified. The collision free property of the geometric path increases the likelihood that the collision free kinematic path can be built starting from the geometric path. In addition, a pair of waypoints, each waypoint defines a position and orientation of the vehicle, provides an advantageous partition of the sampling problem.

Specifically, using a kinematic model of the vehicle, a set of kinematic subgraphs connecting each pair of neighboring waypoints can be determined to form a kinematic graph. For example, in one embodiment, two adjacent waypoints are connected, e.g., using a straight segment of a line or a different geometrical shape. For such a case, each sub-problem can be formulated as 'find a kinematic path connecting two adjacent waypoints'. If all sub-problems can be solved, the initial state can be connected to the target state through a kinematic path. This further implies that the original path planning problem is solved.

Notably, because the neighboring waypoints are usually closer to each other than the initial and target state of the vehicle, the bias sampling of the parking space can be used to build each kinematic subgraph. To that end, each new sample of the state is more likely to be added to the one of the kinematic subtrees, and thus reduce the waste of computations.

In one embodiment, the sub-problems are solved sequentially. For example, a sub-problem one is constructed as to 'find a kinematic subgraph $SG_1$ connecting the initial node and a node corresponding to a second waypoint'; a sub-problem two is constructed as to 'find a kinematic subgraph $SG_2$ connecting the kinematic subgraph $SG_1$ with a third waypoint; finally, the last sub-problem is constructed as 'to find a kinematic graph connecting the next to the last kinematic subgraph with the last waypoint'. In another embodiment, sub-problems are solved in parallel, and thus speed up the computation speed by orders of magnitude. Sub-problems solved in parallel can be different from those solved sequentially.

One embodiment uses a biased sampling to guide state sampling for constructing kinematic graphs. Additionally, or alternatively, one embodiment uses an approximate reachable set into the sampling step to improve the quality of sampled states. By taking the approximate reachable set into account, sampled states which are difficult or costly to connect are rejected. This treatment can reduce computation time wasted in collision detection due to inefficient samples, and also provide a set of waypoints which enable fast construction of the kinematic graph.

Accordingly, one embodiment discloses a method for parking a vehicle within a parking space, wherein the method uses a processor coupled to a memory storing a geometry of the vehicle, a map of the parking space, a kinematic model of the vehicle, and a dynamic model of the vehicle, wherein the processor is coupled with stored instructions implementing the method, wherein the instructions, when executed by the processor carry out at least some steps of the method, including determining, using the geometry of the vehicle and the map of the parking space, a collision free geometric path connecting an initial state of the vehicle with a target state of parked vehicle through a set of waypoints, each waypoint defines a position and orientation of the vehicle; determining, using a kinematic model of the vehicle, a set of kinematic subgraphs forming a kinematic graph having multiple nodes connected with kinematic edges, each kinematic subgraph connects a pair of neighboring waypoints of the geometric path, each node defines a state of the vehicle, and each kinematic edge connecting two nodes defines a collision free kinematic path connecting the two nodes according to kinematics of the vehicle; selecting, from the kinematic graph, a kinematic path connecting an initial node corresponding to the initial state of the vehicle with a target node corresponding to the target state of the vehicle through a set of intermediate nodes; determining, using a dynamic model of the vehicle, a reference trajectory tracking the kinematic path as a function of time; and controlling the motion of the vehicle according to the reference trajectory.

Another embodiment discloses a system for parking a vehicle within a parking space, including a memory storing a geometry of the vehicle, a map of the parking space, a kinematic model of the vehicle, and a dynamic model of the vehicle; a processor coupled to the memory and configured for determining, using the geometry of the vehicle and the map of the parking space, a collision free geometric path connecting an initial state of the vehicle with a target state of parked vehicle through a set of waypoints, each waypoint defines a position and orientation of the vehicle; determining, using a kinematic model of the vehicle, a set of kinematic subgraphs forming a kinematic graph having multiple nodes connected with kinematic edges, each kinematic subgraph connects a pair of neighboring waypoints of the geometric path, each node defines a state of the vehicle, and each kinematic edge connecting two nodes defines a collision free kinematic path connecting the two nodes according to kinematics of the vehicle; selecting, from the kinematic graph, a kinematic path connecting an initial node corresponding to the initial state of the vehicle with a target node corresponding to the target state of the vehicle through a set of intermediate nodes; and for determining, using a dynamic model of the vehicle, a reference trajectory tracking the kinematic path as a function of time; and a controller for controlling the motion of the vehicle according to the reference trajectory.

Yet another embodiment discloses a non-transitory computer readable storage medium embodied thereon a program executable by a processor for performing a method, the method comprising: determining a geometric path connecting an initial state of the vehicle with the target state of the vehicle without collision, wherein the geometric path includes a set of waypoints, each waypoint is defined by a position and orientation of the vehicle, and wherein the geometric path is determined using only geometry of the vehicle and the parking space; determining a kinematic graph having multiple nodes connected with kinematic edges, each node defines a state of the vehicle and each kinematic edge connecting two nodes defines a collision free kinematic path between the two nodes, wherein the nodes of the kinematic graph is grown iteratively from a set of seeds corresponding to the set of waypoints, and wherein the kinematic edge connects two nodes according to kinematics of the vehicle; selecting, from the kinematic graph, a kinematic path connecting an initial node corresponding to the initial state of the vehicle with a target node corresponding to the target state of the vehicle through a set of intermediate nodes; determining a reference trajectory tracking the kinematic path, wherein the reference trajectory is a function of time; and controlling the motion of the vehicle according to the reference trajectory.

DETAILED DESCRIPTION

Figure 1A:
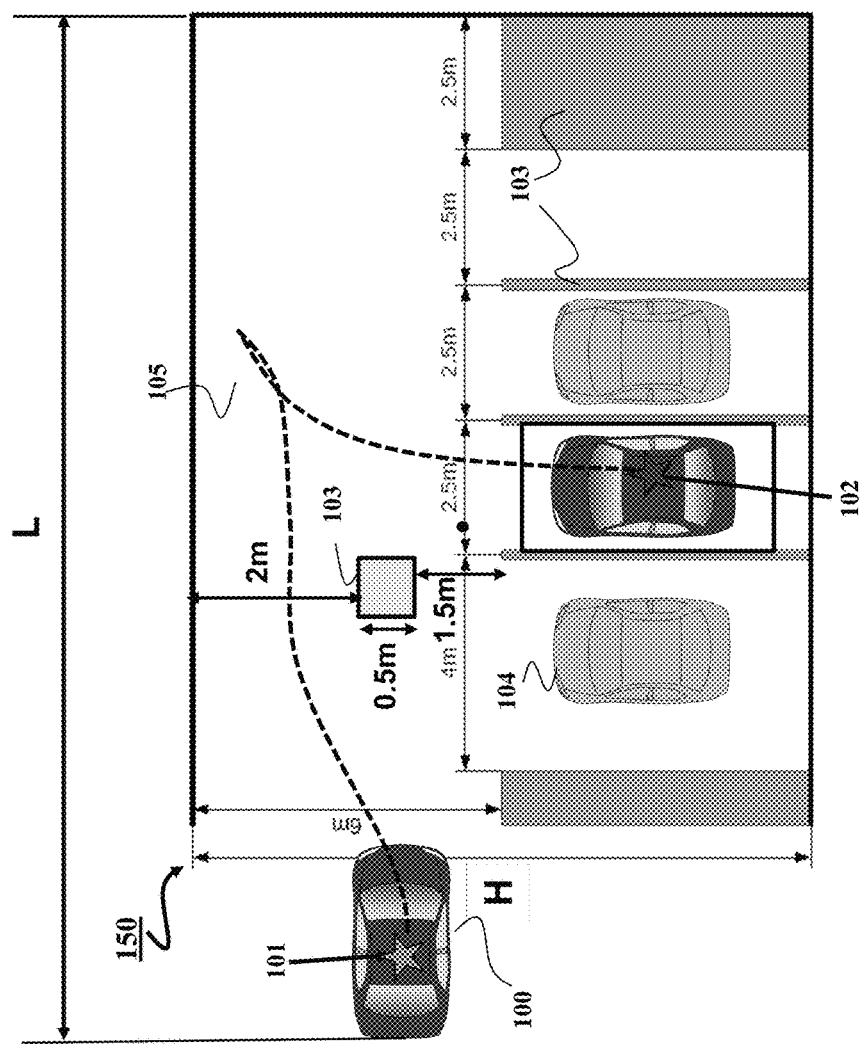
FIG. 1A is an example of a parking scenario addressed by some embodiments.

FIG. 1A shows an example of a parking scenario addressed by some embodiments. In this example, the boundary of a parking space 150 is represented by a rectangle with a size of L×H. The vehicle 100 has an initial state 101, e.g., a current state, and needs to be parked at a parking spot defined by a target state 102. Each state, e.g., the initial and the target state, define position and orientation of the vehicle. The parking space 150 includes obstacles. The obstacles can be part of the layout of the parking space, i.e., permanent obstacles 103, such as walls and/or columns of the parking space. Dimensions of the permanent obstacles are usually known. FIG. 1A depicts non-limiting examples of such dimensions.

Additionally, or alternatively, the obstacles can include other parked or moving vehicles 104. Geometrical dimensions of the vehicles 104 and the vehicle 100 to be parked can be determined based on the type of the vehicle. For clarity, this disclosure considers a front wheel drive vehicle; although different embodiments are applied to other vehicles including rear wheel drive and full wheel drive vehicles.

In some embodiments, the layout of the parking space and position of the obstacles 103 are specified on the map of the parking space. Such a map can be predetermined or constructed in real time during or before the parking. Various embodiments determine a kinematic path 105 connecting the initial state and the target state such that the kinematic path is feasible and collision free.

Figure 1B:
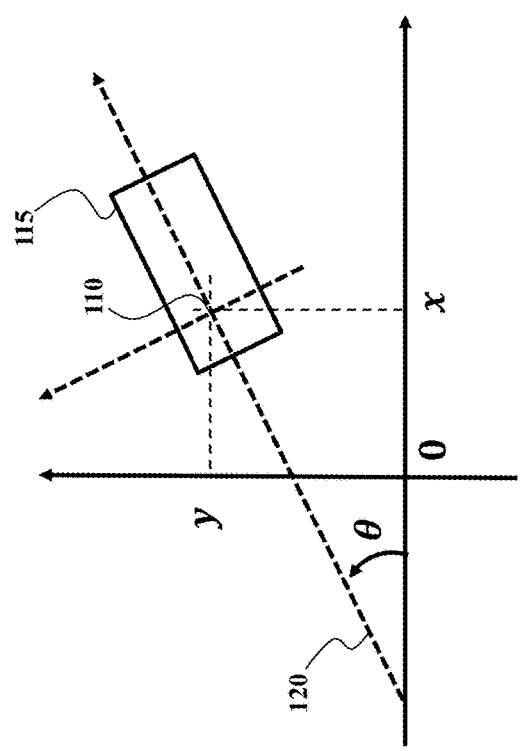
FIG. 1B is an exemplar schematic of geometrical representation of a vehicle according to some embodiments.

FIG. 1B shows an exemplar schematic of geometrical representation of a vehicle according to some embodiments. In this example, the vehicle is abstracted as a rectangle 115. The vehicle state includes the position (x,y) 110, which represents the midpoint of its rear wheel axis, and the orientation θ 120, which denotes the angle between the vehicle body axis and the horizontal axis.

Motion planning, which determines how fast the vehicle moves along the path, uses the dynamic model of the vehicle 100. As used herein, a dynamic model of a vehicle accounts for time-dependent changes in the state of the vehicle. Dynamic models typically are represented by differential equations. In one embodiment, the dynamic model of the vehicle is fifth order differential equations $$\dot{x} \pm = \cos(\theta)\cos(\zeta)v$$

$$\dot{y} = \sin(\theta)\cos(\zeta)v$$

$$\dot{\theta} = \sin(\zeta)v/l$$

$$\dot{v} = a_1$$

$$\dot{\zeta} = a_2, \quad (1)$$

where v the velocity of the front wheels, ζ the angle between the front wheels and the vehicle orientation, $a_1$ the translational acceleration, $a_2$ the steering angular velocity, and l the distance between (x,y) and the midpoint of the front wheels.

For the path planning, some embodiments use a kinematic model of the vehicle that describes the motion of the vehicle without consideration of the mass of the vehicle or the forces that caused the motion.

In one embodiment, the following kinematic model is considered $$\dot{x} = \cos(\theta)u_1$$

$$\dot{y} = \sin(\theta)u_1$$

$$\dot{\theta} = u_2, \quad (2)$$

where $u_1 = \cos(\zeta)v$ the velocity of the midpoint of the rear wheel axis, $u_2 = \tan(\zeta)u_1/l$.

A path is kinematically feasible if it is a solution of the kinematic model (2). A vehicle state X=(x,y,θ) is collision free only if the vehicle located at position X does not collide with any obstacle, and lies completely inside the boundary of the parking space. The initial state 101 is abbreviated as $X_0=(x_0, y_0, \theta_0)$, and the target state 102 is denoted by $X_f=(x_f, y_f, \theta_f)$. For a specific parking task with a parking space represented by a rectangle L×H, the vehicle state always belongs to a state space X: [0, L)×[0, H)×[0,2π).

Some embodiments determine whether a vehicle state is without collision based on a geometric representation of the parking space, which is also referred to as a map of the parking space. In one embodiment, the map of the parking space is derived by approximating all obstacles and the boundary of the parking space as simple geometric shapes. In one embodiment, obstacles 103 in the environment (equivalently the parking space) can be approximated as rectangles, which are derived by constructing a minimal bounding box for each obstacle. With geometric approximation of obstacles and boundary of the parking space, the parking space or the environment can be fully described by a list of geometric objects.

Figure 1C:
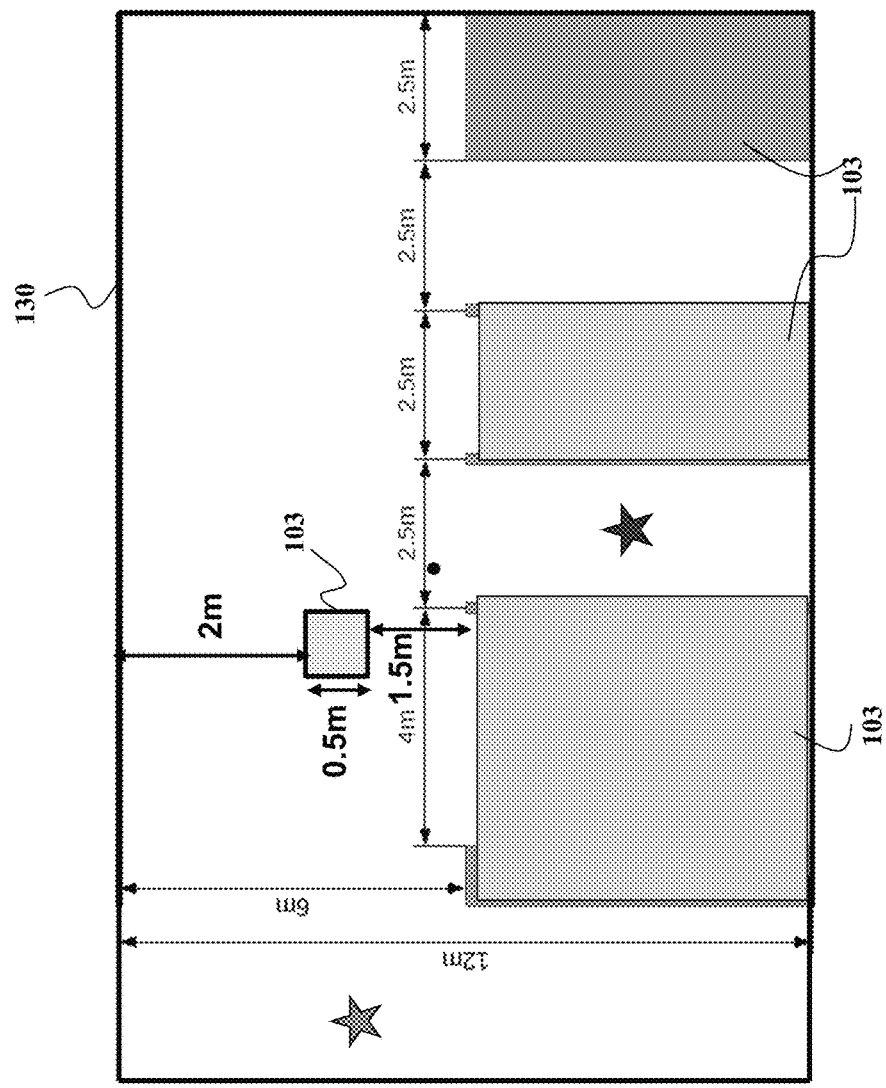
FIG. 1C is a schematic of a map of a parking space corresponding to the parking scenario of FIG. 1A.

FIG. 1C shows a map 130 of a parking space corresponding to the parking scenario of FIG. 1A. Both types of obstacles are merged together as one type of permanent obstacles 103 using a rectangular representation. An obstacle can be approximated by multiple geometric shapes, depending on computing power of an onboard processor for path planning. For instance, in another embodiment, obstacles can be approximated by constructing a bounding circle for each obstacle if the computing power is not sufficient. Alternatively, an obstacle can be approximated by a polytope, which however may increase computation burden in path planning. Also, obstacles in the parking space might not be approximated by the same geometric shape.

Figure 2A:
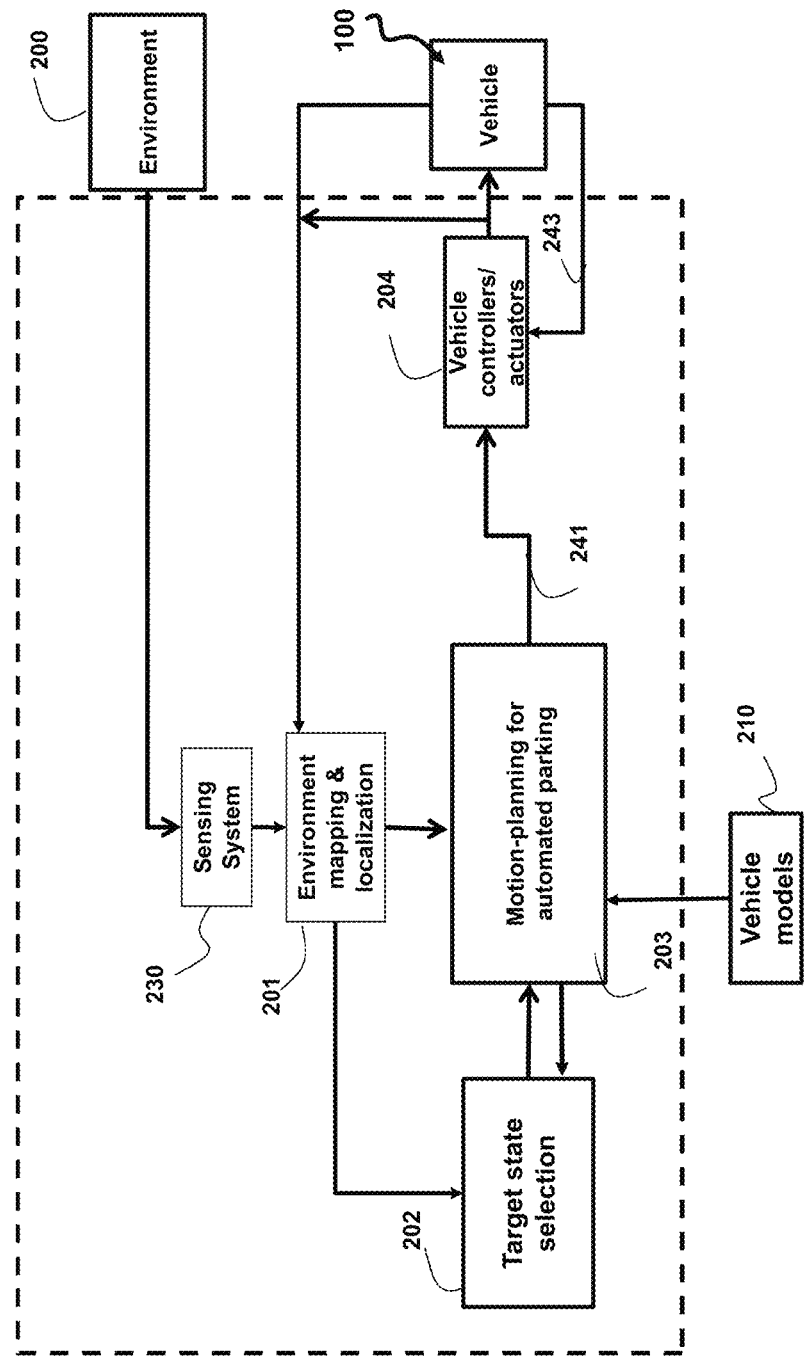
FIG. 2A is a function diagram of an automated parking system according to one embodiment.

FIG. 2A shows a function diagram of automated parking system according to one embodiment. Environment mapping and localization block 201 constructs or updates the map of the parking space, and determines the current location of the vehicle by sensing the environment and vehicle operation condition. For example, an inertial measurement unit, which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 200 can be video cameras capturing obstacles including other vehicles, pedestrians, and buildings, ultrasonic/radar sensors detecting distance between the vehicle and obstacles, etc. In one embodiment, the environment map is further processed to generate a geometric representation of the parking space as shown in FIG. 1C.

Target state selection block 201 selects a target state for a parking spot to park the vehicle by identifying parking lot candidates, and sends the target state to a motion planning block 203. In one embodiment, the available parking spots are tracked by a separate system associated with the management of the parking garage. Additionally, or alternatively, the parking spots can be detected using the sensors 203 of the automated parking system. In one embodiment, the motion planning block checks to determine whether the target state is parkable, i.e., there is a feasible path to the parking spot, or not, and notifies the target state selection block 202 the check result. If the target state is not parkable, the target selection block 202 selects another target state for evaluation. In another embodiment, the target state selection block 201 can also evaluate whether the target state is parkable, and only sends a parkable target state to the motion planning block.

If the target state is parkable, then the motion planning 203 initiates a complete motion planning procedure to determine a reference trajectory 241 based on the vehicle models 210, the initial and target states of the vehicle, and the map of the parking space. In one embodiment, the reference trajectory defines profiles of the vehicle velocity and steer angle over time. In another embodiment, the reference trajectory defines the profile of the vehicle state (x,y,θ) over time.

Given the reference trajectory 241, vehicle controllers and actuators 204 determine and exert control commands to enforce the vehicle state track the reference trajectory 241 if the reference trajectory is state profile, or to enforce the vehicle velocity and steer angle track the reference trajectory if the reference trajectory is the vehicle velocity and steer angle profiles. In one embodiment, the control commands could be gas pedal pressure or steering torque. The vehicle controller/actuators may also use signal 243 to determine control commands. The signal 243 can be a measured steering angle, or measured currents of motors moving the steering wheel or the gas pedal.

Figure 2B:
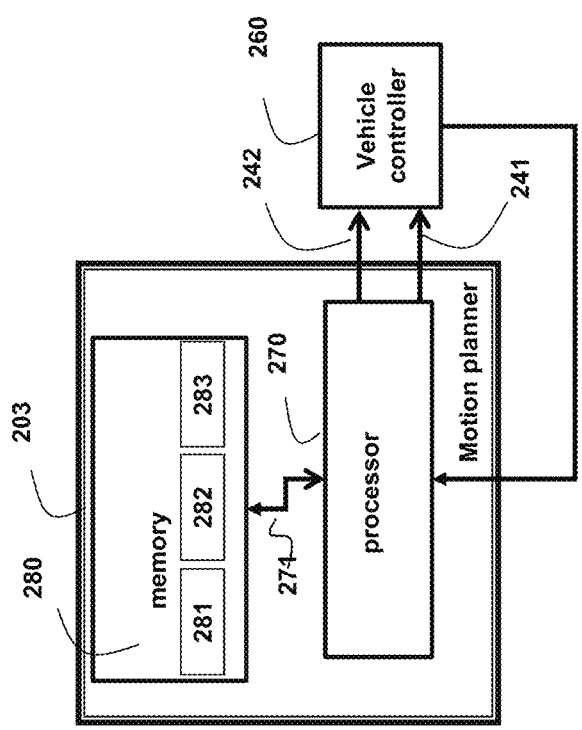
FIG. 2B is a general structure of the motion-planning system according to one embodiment.

FIG. 2B shows a general structure of the motion-planning system 203 according to one embodiment. The motion-planning system 203 includes at least one processor 270 for executing modules of the motion-planning system 203. The processor 270 is connected 271 to a memory 280 that stores geometrical information 281 such as geometry of the vehicle and a map of the parking space. The memory 280 can also store the models of the vehicle 282 such as a kinematic model of the vehicle and a dynamic model of the vehicle. The memory 280 can also store the internal information 283 of the motion planner, including, but not limited to, an initial state of the vehicle, a target state of parked vehicle, cost function, values of each computed state, the motion leading up to each state, a geometric graph, a kinematic graph, waypoints, reference trajectory. In some embodiments, the memory 280 can include stored instructions implementing the method for the automated parking, wherein the instructions, when executed by the processor 270 carry out at least some steps of the method.

Some embodiments are based on recognition that the parking problem can be solved using at least two stages. At the first stage, the kinematic path connecting the initial with the target state of the vehicle is constructed. At the second stage, the actual trajectory following the kinematic path is determined. Such an approach is advantageous because the kinematic path can be constructed using the kinematic model, which is simpler than the dynamic model of the vehicle.

Figure 3A:
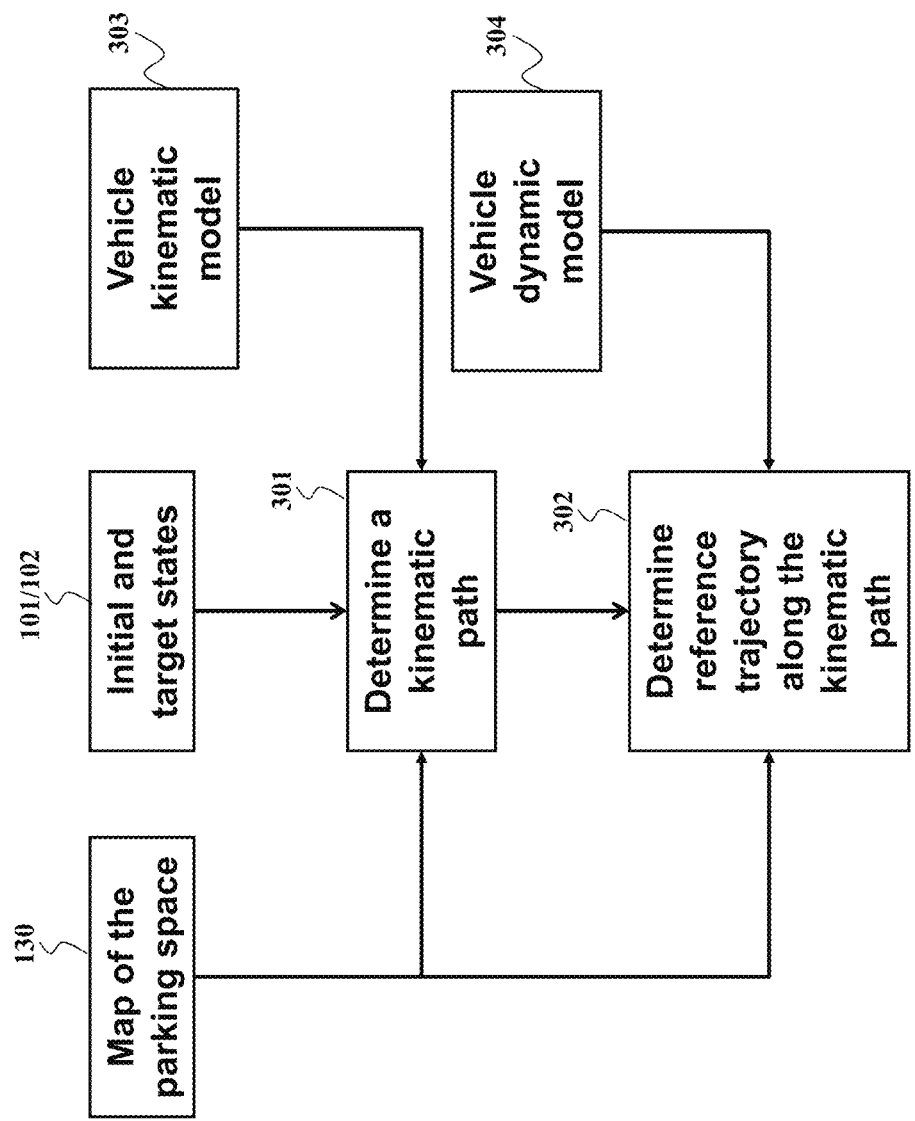
FIG. 3A is a block diagram of the stages of the motion planning according to some embodiments.

FIG. 3A shows a block diagram of the stages of the motion planning 203 according to some embodiments. Block 301 determines a kinematic path based on the geometry of the vehicle and the map 130 parking space, the initial 101 and target 102 states of the vehicle, and the vehicle kinematic model 303. The kinematic path is further processed in block 302 to generate the reference trajectory which is a solution of the vehicle dynamic model 304.

Such a problem partition can reformulate the original parking problem in the following problem. Given geometry of the vehicle, maps of the parking space, and a kinematic model of the vehicle, find a feasible, collision free path, referred herein as kinematic path, connecting the initial state to the target state. Kinematic feasibility ensures that the kinematic path is a solution of the vehicle kinematics with the initial state as its initial value, and thus can be followed by the vehicle starting at the initial state. A collision free property guarantees that the vehicle does not collide with obstacles in a parking space while moving along the kinematic path.

Despite the fact that kinematic model is usually simpler that the dynamic model of the vehicle, when the entire parking space needs to be sampled and tested for kinematic feasibility of the kinematic path, the solution for automated parking problem still can be computationally impractical. Compared with path planning for vehicle highway driving, path planning for vehicle automated parking systems has unique characteristics: the collision free space in the environment is typically very tight, which requires sampling based algorithms explore the parking space at much slower pace. As a result, it is more challenging to construct in real-time a kinematic path connecting two states in the collision free space.

Figure 3B:
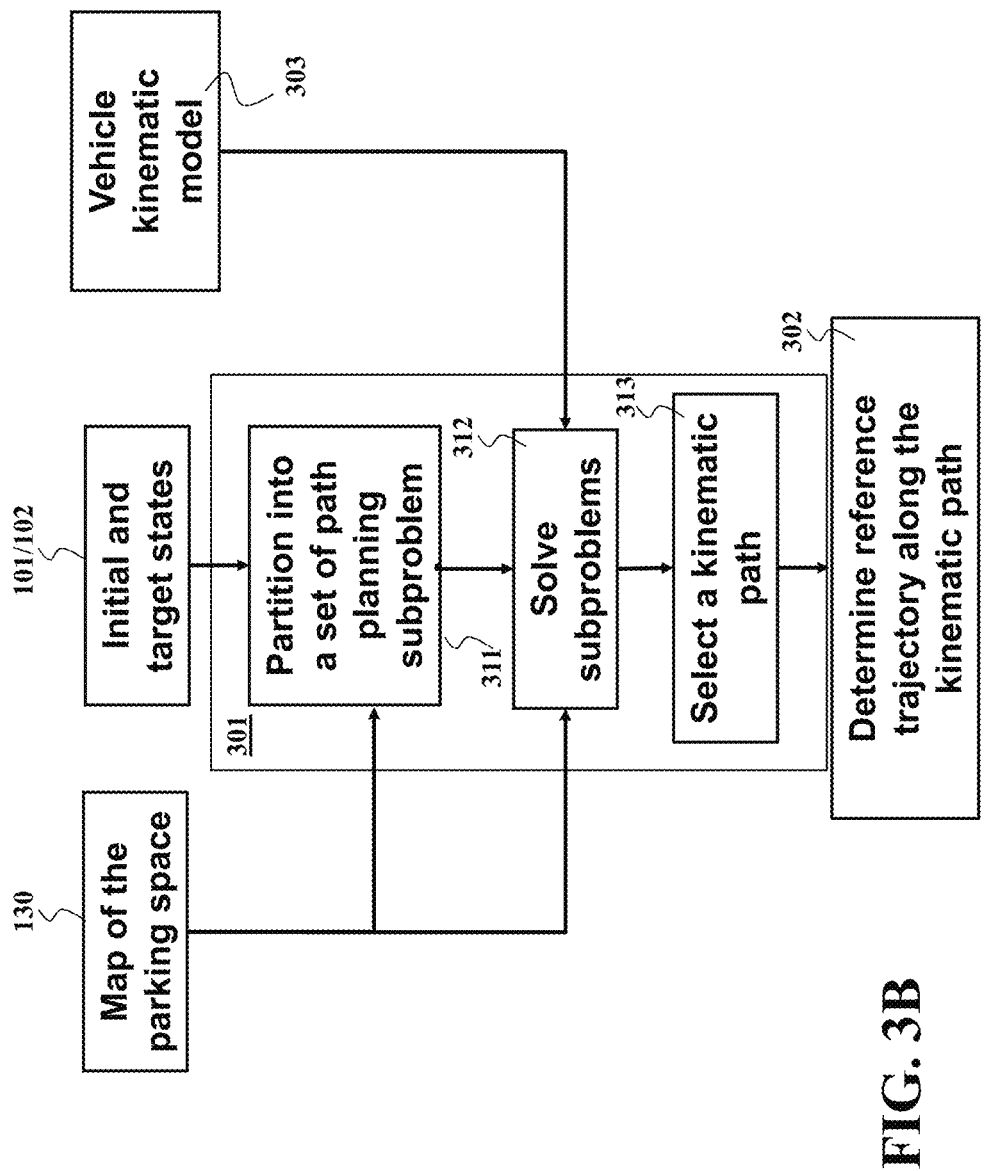
FIG. 3B is a schematic of partitioning determination of the kinetic path into a set of planning sub-problems according to some embodiments.

FIG. 3B shows a schematic of partitioning 311 determination of the kinetic path 301 via sampling the state for the entire parking space into a set of planning sub-problems 312.

The kinematic path 313 is selected from the union of the solutions of the sub-problems 312.

Some embodiments are based on recognition that the sampling of the parking space problem needs to be partitioned into a set of sub-problems such that the solution of each sub-problem can be connected to determine the feasible kinematic path connecting the initial and the target state. In addition, the partitioning into the set of sub-problems should provide guidance on how to sample the partitioned parking space. This is because in a general sampling problem, a sampled state has a low probability to be close and added to the kinematic tree built in the parking space, if the initial and target states are relatively far. The low probability means that the computation taken to determine the proximity to the kinematic trees is more likely wasted. To avoid wasting computation in the detection of the proximity, a sampled state, though far from both trees, can be treated as a neighbor of the kinematic trees. Such a treatment however necessarily leads to waste more computation in collision detection. This is because for a sampled state, treated as a neighbor to the kinematic trees even though it is relatively far from both trees, the probability of having collision free connections between the sampled state and both trees are low. Any computation applied to detect low probability events is most likely wasted and thus incurs low computation efficiency.

Some embodiments are based on realization that a collision free geometric path connecting an initial state of the vehicle with a target state of parked vehicle through a set of waypoints can be used to partition the sampling problem for building the kinematic path into a set of sub-problems, which can increase the computational efficiency of the sampling and provide a feasible kinematic path.

Figure 4A:
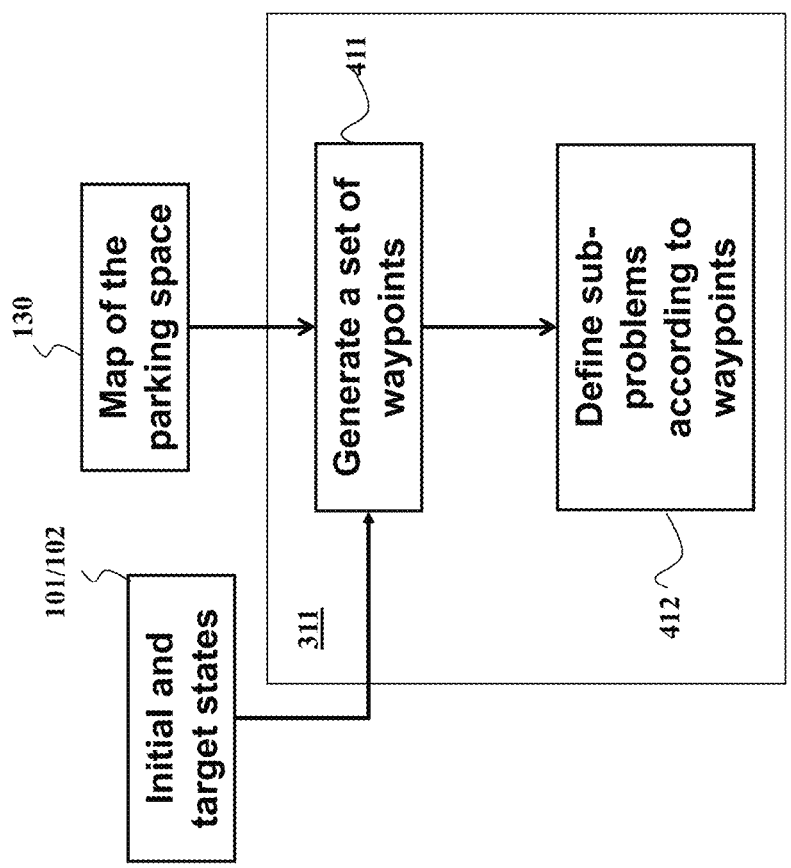
FIG. 4A is a block diagram of partitioning the kinematic path planning problem into a set of sub-problems according to some embodiments.

FIG. 4A shows a block diagram of partitioning the kinematic path planning problem into a set of sub-problems. The partitioning relies on a block 411 to generate a set of waypoints based on the initial and target states and the geometry of the vehicle and the parking space. Each waypoint defines a milestone vehicle state. Typically, a first waypoint corresponds to the initial state $X_0$, and a last waypoint corresponds to the target state $X_f$. Also, the set of waypoints shall satisfy a following connected property: all waypoints are connected with collision free edges, where the edge can represent a geometric or kinematic connection between two nodes (or states). In one embodiment, given two arbitrary states $X_1$, $X_2$, the geometric edge between them can be a straight line; and the kinematic edge between them can be any feasible solution satisfying the vehicle kinematics (2) and boundary conditions $X(t_1)=X_1$, $X(t_2)=X_2$ for any bounded $0 \le t_1 \le t_2 < \infty$.

For example, the geometric path via the waypoints can be built using only geometry of the vehicle and a map of the parking space, i.e., without consideration of the kinematic or dynamic model of the vehicle. In such a manner, the computation of the geometric path is simplified. The collision free property of the geometric path increases the likelihood that the collision free kinematic path can be built atop of the geometric path. In addition, a pair of waypoints, each waypoint defines a position and orientation of the vehicle, provides an advantageous partition of the sampling problem.

Figure 4B:
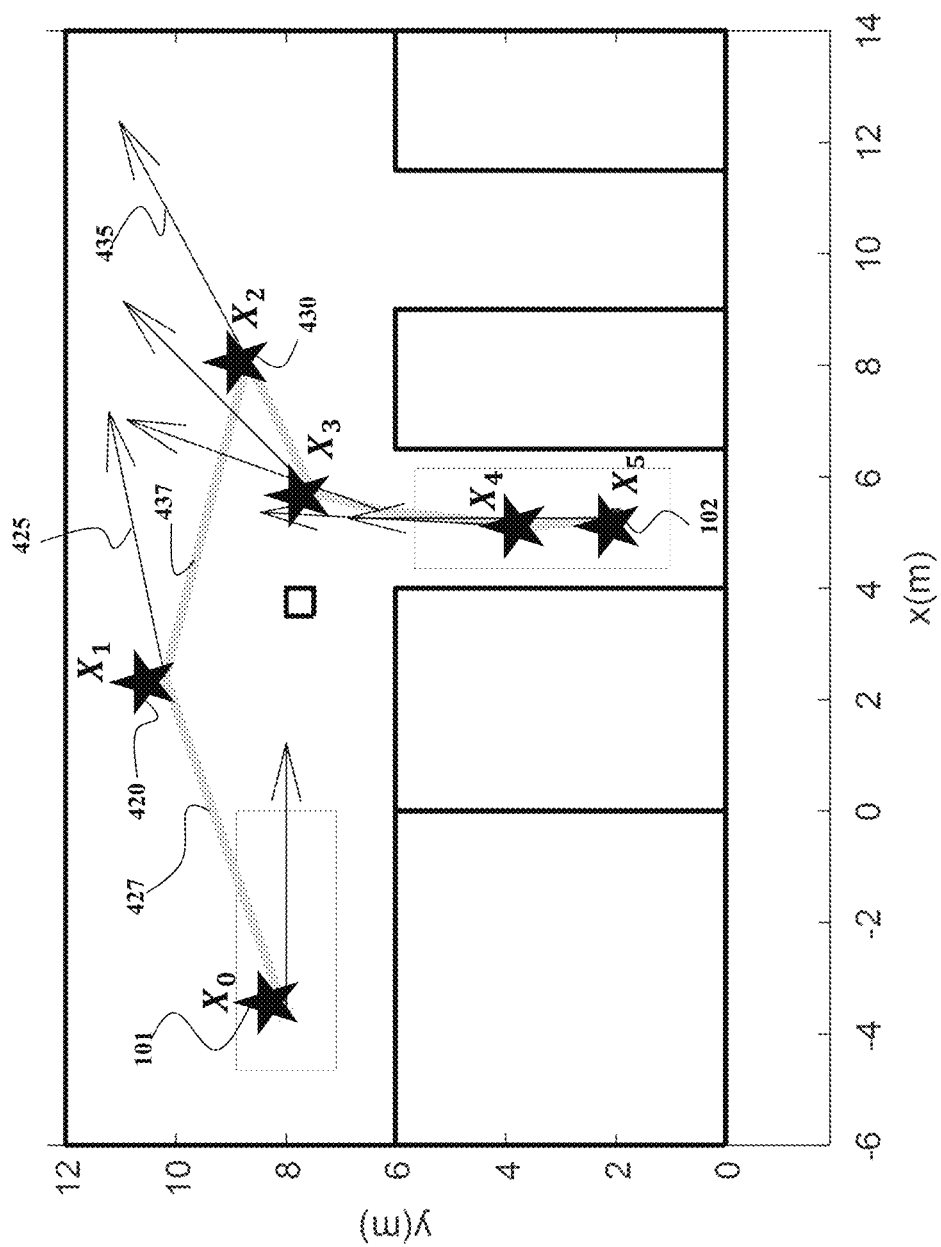
FIG. 4B is a schematic of the parking scenario of FIG. 1A with a set of waypoints partitioning the kinematic path planning problem into a set of sub-problems according to some embodiments.

FIG. 4B shows a schematic of the parking scenario of FIG. 1A with a set of waypoints used to partition the kinematic path planning problem into a set of sub-problems. The set of waypoints define vehicle states $X_0, \ldots X_5$ where each waypoint defines a vehicle state including a position and orientation of the vehicle. The waypoints $X_0$ and $X_5$ correspond to the initial and target states, respectively. For example, a waypoint corresponding to the state $X_1$ defines position 420 and the orientation 425 of the vehicle. Similarly, a waypoint corresponding to the state $X_2$ defines position 430 and the orientation 435 of the vehicle. The waypoints are collision free and connected with collision free geometric edges, e.g., the straight lines 427 and 437.

Some embodiments, using a kinematic model of the vehicle, determine a set of kinematic subgraphs connecting each pair of neighboring waypoints to form a kinematic graph. For example, each sub-problem can be formulated as 'find a kinematic path connecting two adjacent waypoints'. If all sub-problems can be solved, the initial state can be connected to the target state through a kinematic path. This further implies that the original path planning problem is solved.

Figure 4C:
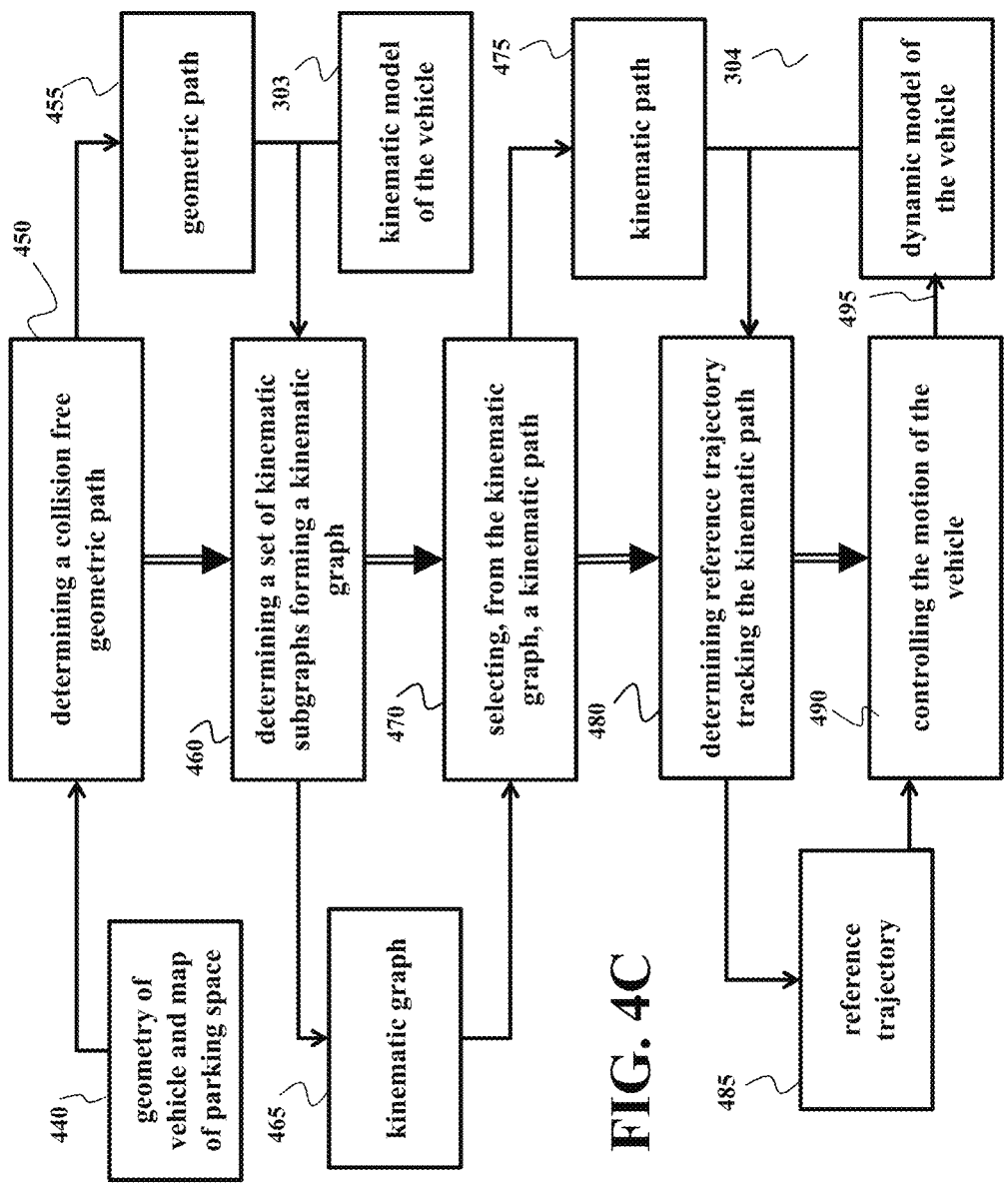
FIG. 4C is a block diagram of a method for parking a vehicle within a parking space according to some embodiments.

FIG. 4C shows a block diagram of a method for parking a vehicle within a parking space. The method uses a processor coupled to a memory storing geometry of the vehicle and a map of the parking space 440. The memory can also store a kinematic model 303 of the vehicle and a dynamic model 304 of the vehicle. The processor is coupled with stored instructions implementing the method, wherein the instructions, when executed by the processor carry out at least some steps of the method.

The method determines 450, using the geometry of the vehicle and the map of the parking space 440, a collision free geometric path 455 connecting an initial state of the vehicle with a target state of parked vehicle through a set of waypoints. Each waypoint defines a position and orientation of the vehicle, e.g., as shown in FIG. 4B. The method determines 460, using a kinematic model 303 of the vehicle, a set of kinematic subgraphs forming a kinematic graph having multiple nodes connected with kinematic edges. Each kinematic subgraph connects a pair of neighboring waypoints, each node defines a state of the vehicle, and each kinematic edge connecting two nodes defines a collision free kinematic path connecting the two nodes according to kinematics of the vehicle.

Figure 4D:
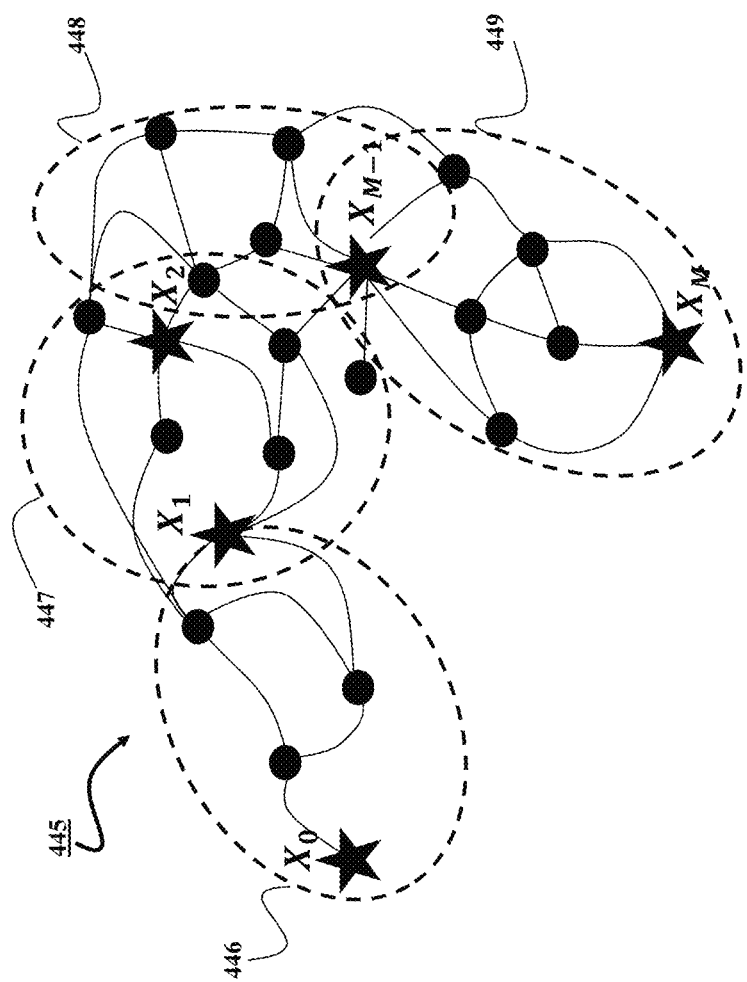
FIG. 4D is an example of the set of kinematic subgraphs forming a kinematic graph according to one embodiment.

FIG. 4D shows an example of the set of kinematic subgraphs forming a kinematic graph according to one embodiment. In this example, the kinematic graph 445 is formed by four kinematic subgraphs 446, 447, 448, and 449. For example, each of the subgraph can be iteratively grown, e.g., iteratively, from a set of seeds corresponding to the set of waypoints.

Notably, because the neighboring waypoints are usually closer to each other than the initial and target state of the vehicle, the bias sampling of the parking space can be used to build each kinematic subgraph. To that end, each new sample of the state is more likely to be added to the one of the kinematic subtrees, and thus reduce the waste of computations.

In one embodiment, the sub-problems are solved sequentially. For example, a sub-problem one is constructed as to find a kinematic subgraph $SG_1$ connecting the initial node corresponding to a first waypoint $X_0$ and a node corresponding to a second waypoint $X_1$; a sub-problem two is constructed as to find a kinematic subgraph $SG_2$ connecting the kinematic subgraph $SG_1$ with a third waypoint $X_2$ and so on; finally, the last sub-problem is constructed as to find a kinematic graph connecting the next to the last kinematic subgraph $SG_{M-1}$ with the last waypoint $X_M$. In another embodiment, sub-problems are solved in parallel, and thus speed up the computation speed by orders of magnitude. Sub-problems solved in parallel can be different from those solved sequentially.

Figure 5A:
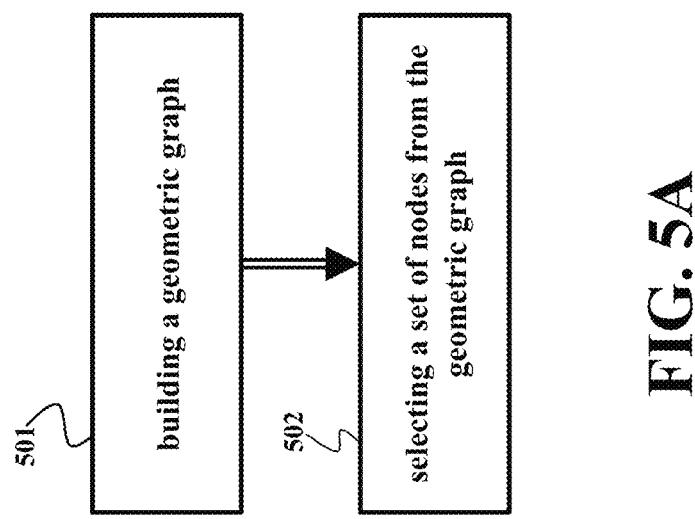
FIG. 5A is a flow chart of a method for determining the geometric path according to some embodiments.

FIG. 5A shows a flow chart of a method for determining the geometric path according to some embodiments. The method builds 501 a geometric graph GG connecting the initial node with the target node through a set of collision free nodes. Each pair of nodes in the geometric graph is connected with a collision free edge determined using only geometry of the vehicle and the parking space. The geometric graph is similar to the kinematic graph except that the edges between nodes in the geometric graph are geometric instead of kinematic. Because of the employment of geometric edges, the geometric graph can be constructed much faster than the kinematic graph. Next, the method selects 502 a set of nodes from the geometric graph forming the set of waypoints of the geometric path.

For example, in one embodiment, the geometric graph is built by sampling, e.g., uniformly or randomly, the state space of the parking space and testing the connections between neighboring sampled states for collision free connection according to the geometry of the vehicle and the parking space. The sampled state that do not have a single collision free connection are pruned and the rest of the sample states form the nodes of the geometric graph.

Figure 5B:
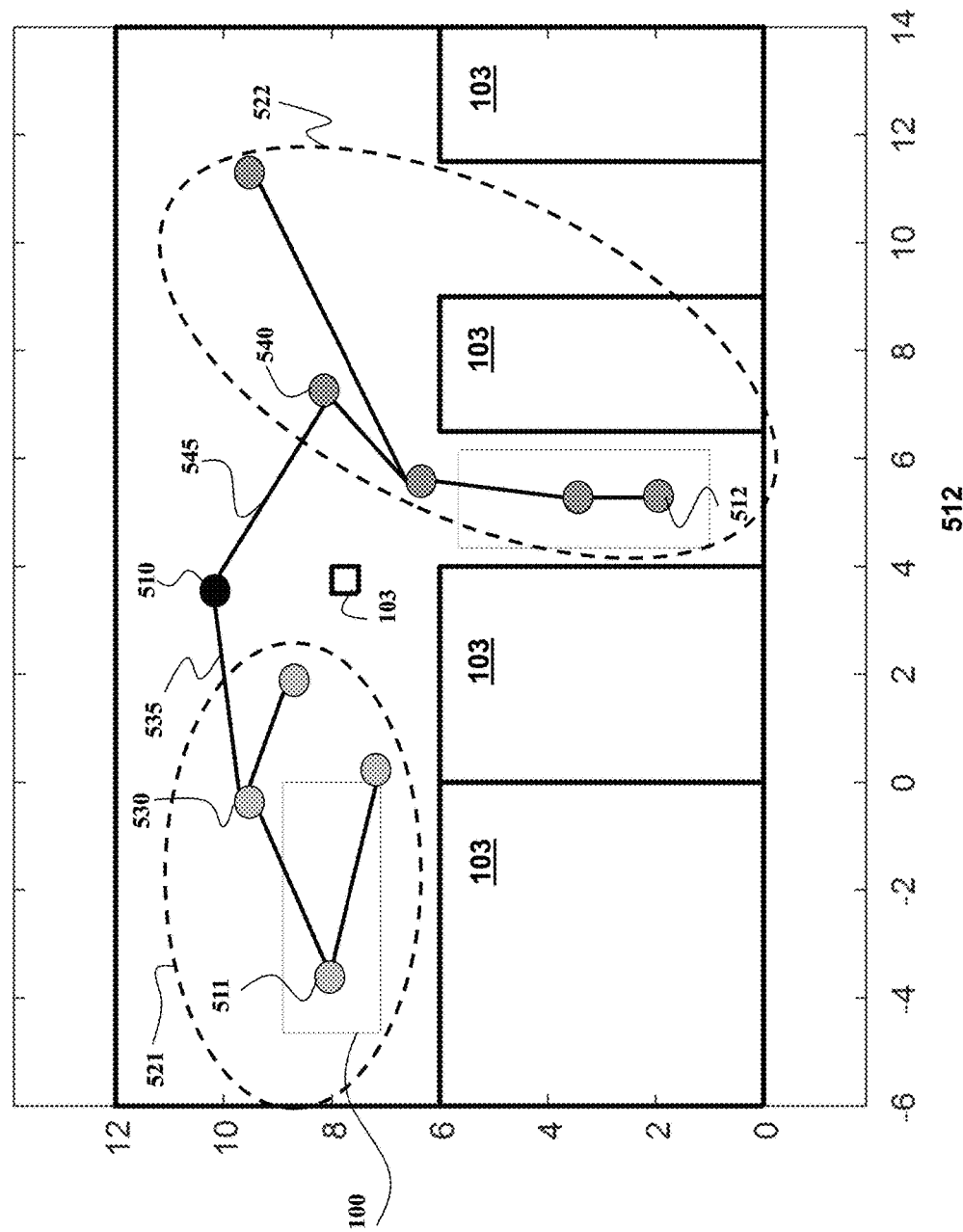
FIG. 5B is a schematic of building the geometric graph according to one embodiment.

FIG. 5B shows a schematic of building the geometric graph according to one embodiment. In this example, the geometric graph is built from both ends using an initial geometric tree $GT_i$ 521, having an initial node 511 corresponding to the initial state 101, and a target geometric tree $GT_t$ 522, having an target node 512 corresponding to the target state 102. The initial geometric tree has a node set $V_{GTi}$ and an edge set $E_{GTi}$. The target geometric tree has a node set $V_{GTt}$ and an edge set $E_{GTt}$.

During a current iteration, a state 510, denoted by X=(x, y,θ), is sampled according to a certain sampling scheme, and has been verified being collision free. Next is to determine a nearest node, e.g., a node 530 located on the initial geometric tree. If a geometric edge 535 between the nearest node 530 from the initial tree 521 and the sampled state 510 is collision free, a new node corresponding to the sampled state 510 is created and added to the node set of the initial geometric tree and the edge 535 is added to the edge set of the initial geometric tree.

Similar procedure is applied to the target geometric tree for the sampled state 510. That is, a nearest node 540 located on the target geometric tree 522 is identified. If a geometric edge 545 between the node 540 and the sampled state is collision free, a new node corresponding to the sampled state is created and added to the node set of the target geometric tree, and the edge 545 is added to the edge set of the target geometric tree. If both edges 535 and 545 are collision free, the initial and target geometric trees are connected, in which case, the initial node and the target node are connected. To that end, the geometric graph is a union of the initial and target geometric trees.

Additionally, or alternatively, some embodiments perform the sampling using a reachability criterion. According to the reachability criterion, the sample in the state space is preserved only if that sample is reachable from the already constructed graph. In one embodiment, to avoid usage of the dynamic of the vehicle to test reachability, the reachability is defined as an absence of non-reachability, and non-reachability is a predetermined area near the sides of the vehicle.

Figure 5C:
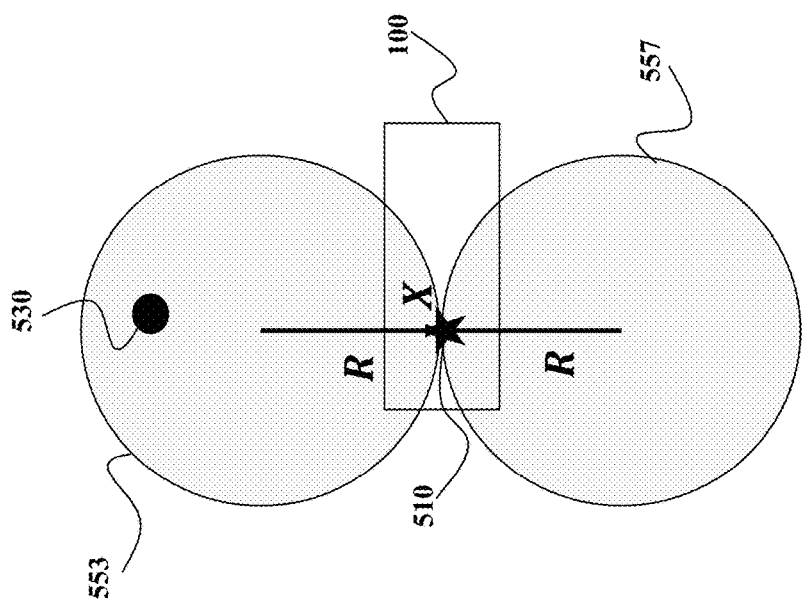
FIG. 5C is a schematic of exemplars non-reachable areas for a vehicle according to some embodiments.

FIG. 5C shows a schematic of exemplars non-reachable areas 553 and 557 for a vehicle 100 in the state 510 defining position and orientation of the vehicle. In this example, the non-reachable areas are represented by the circles of the vehicle motion starting at the state 510 and moving at the predetermined speed with the wheel of the vehicle reaching the maximum extend to the left or to the right. If the previously sample state 530 is within the non-reachable areas 553 and 557, the state 510 is not connected to the node of state 530. If all nodes of the geometric graph are within the non-reachable area of the sampled state, that sampled state is rejected.

Figure 5D:
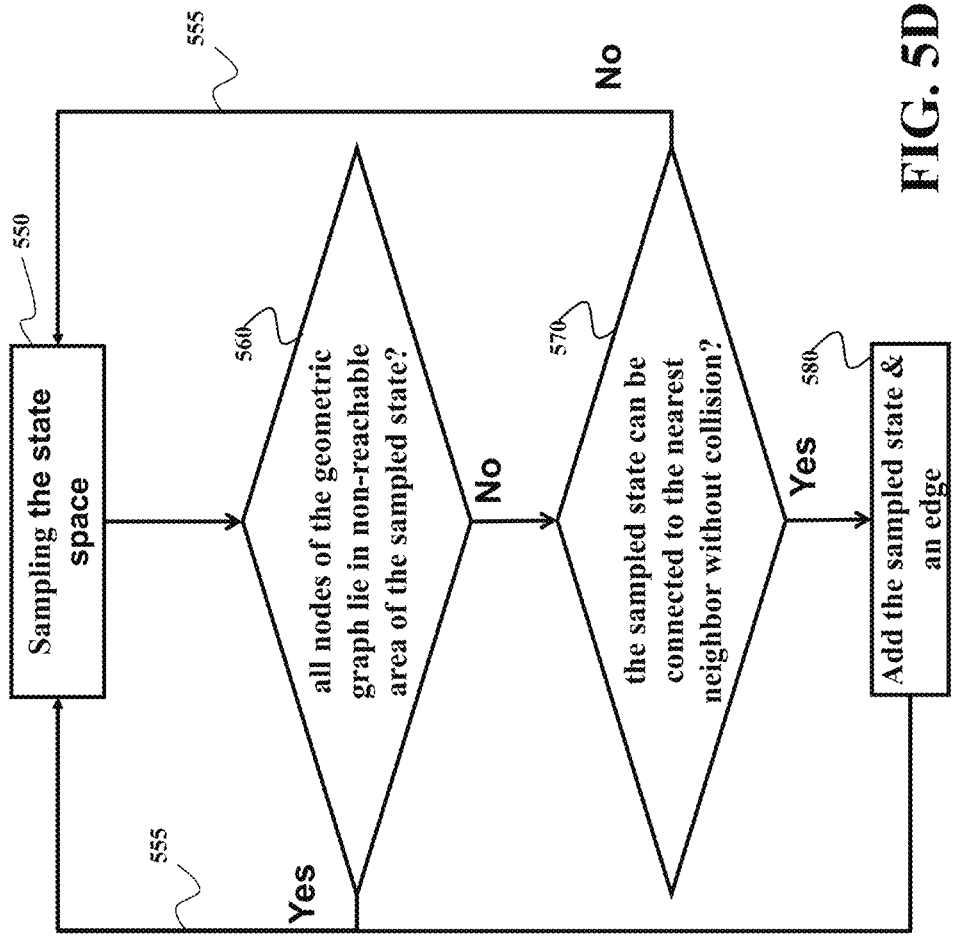
FIG. 5D is a flow chart of a method for building the geometrical graph according to one embodiment.

FIG. 5D shows a flow chart of a method for building the geometrical graph according to one embodiment. In this embodiment, the sampled state X, in addition to being tested collision free, is evaluated by certain drivability criteria to improve the quality of waypoints. The drivability criteria can improve the computation efficiency in the construction of the kinematic graph.

The method samples 550 a point in the state space of the parking lot to produce a sampled state. The sampled state is rejected 555 if all states corresponding to the nodes of the geometrical graph are within 560 a non-reachable area of the sampled state. Otherwise, the method determines 570 a nearest node of the geometric graph having a state nearest to the sampled state and adds 580 a node for the sampled state to the geometric graph and connecting the added node with the nearest node via an edge if the edge is collision free.

The method repeats the sampling, the rejecting, the determining, and the adding until the initial node is connected to the target node. For example, in one embodiment, construction of the geometric graph stops as long as the initial and target geometric trees are connected. In another embodiment, construction of the geometric graph stops until certain number of sampled states are added to both the initial and target geometric trees.

The geometric graph includes nodes and edges representing geometric connections between the nodes such that the initial node is connected with the target node. Given the geometric graph, there can be many geometric paths from the initial state to the target state. It is advantageous to select a geometric path from the geometric graph that reduces a certain cost function. For example, one embodiment selects the geometric path by performing two steps: a) determining a cost for each node, where the node cost represents the minimal cost from the state specified by the node to the target state; b) starting with the initial node, selecting a set of nodes according to the node cost, where the cost of the initial node reaches minimum only if the vehicle passes through the set of nodes.

The node cost is determined by costs of edges. Given two nodes $N_i$, $N_j$ corresponding to vehicle states $X_i$, $X_j$, respectively, and assume that $N_i$ and $N_j$ are connected by an edge $E_{i,j}$. The cost of the edge $E_{i,j}$ is defined as a vector norm: $c(E_{i,j}) = \sqrt{(X_i-X_j)^T Q (X_i-X_j)}$, where Q is a positive definite matrix. In the case Q is 1, the edge cost is reduced to the Euclidian vector norm. Costs of all edges are computed as above during the construction of the geometric graph. For any node $N_i$, its cost is denoted by $V(N_i)$, and can be obtained by performing the following value iteration $$V^k(N_i) = \min_{j \in I}\{V^{k-1}(N_j) + c(E_{i,j})\}, k = 1, 2, \ldots , \quad (3)$$

where I is the index set of nodes connected to the node $N_i$, and $V^k(N_i)$ is the value of the node cost $V(N_i)$ at the kth value iteration. One value iteration for the geometric graph means performs the value iteration (3) for all nodes for a fixed k. The value iteration requires an initial guess of the node cost, which is the node cost at k=0.

In one embodiment, $V^0(N_i)=0$ for all nodes. It has been established that when k→∞, $V^k(N_i)$ converges to the minimal cost of the node $N_i$, and thus the minimal cost of the node can be obtained by value iteration. The value iteration is conducted iteratively, and the iteration, in practice, has to be stop according to certain criteria. In one embodiment, the iteration stop when k reaches a preset large positive number. In another embodiment, the iteration stops when $|V^k(N_i)-V^{k-1}(N_i)|$ for all nodes are less than a threshold.

Denote the minimal cost of the node $N_i$ result from the value iteration as $V(N_i)$. The set of nodes representing the best geometric path is determined by performing policy iteration. That is: provided that $N_i$ is one node of the best geometric path, the next node of $N_i$ is determined by solving $$N_{next} = \arg\min_{N_j, j \in I}\{V(N_j) + c(E_{i,j})\}.$$

Figure 5E:
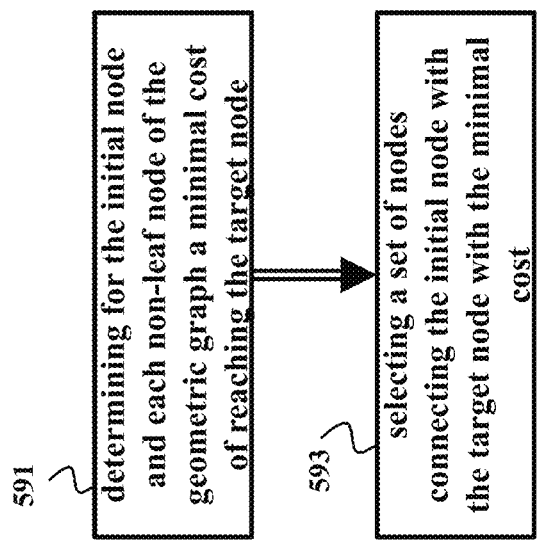
FIG. 5E is a block diagram of a method for selecting the kinematic path according to one embodiment.

As an example, applying the policy iteration to the geometric graph in FIG. 5E, where the policy iteration starts with the initial node corresponding to the initial state, and stops at the target node, gives the best geometric path represented by the green line, and the set of nodes correspond to the vehicle states $X_0, X_1, \ldots, X_5$.

In another embodiment, the best geometric path is determined by three steps: a) trimming the geometric graph by removing all leaf nodes except the initial and target nodes, where a leaf node has only one neighbor node; b) determining the minimal cost of each node by performing the value iteration over the geometric graph after trimming; c) starting with the initial node, selecting a set of nodes according to the geometric graph after trimming. This embodiment is based on realization that the best geometric path does not contain any leaf node, and thus performing value iteration over the geometric graph after trimming gives the same minimal cost of all non-leaf nodes. This embodiment can significantly reduce computation load of determining the minimal cost of the node, and the best geometric path. A set of waypoints can be extracted from the set of nodes defining the best geometric graph.

FIG. 5E shows a block diagram of a method for selecting the geometric path 455 according to one embodiment. The method determines 591 for the initial node and each non-leaf node of the geometric graph a minimal cost of reaching the target node and selects 593 a set of nodes connecting the initial node with the target node with the minimal cost determined for the initial node to form the set of waypoints of the geometric path. For example, before determining the cost for the nodes, the method can remove the leaf nodes except the initial node and the target node from the geometric graph and remove the edges connecting the removed leaf nodes from the geometric graph.

Figure 6A:
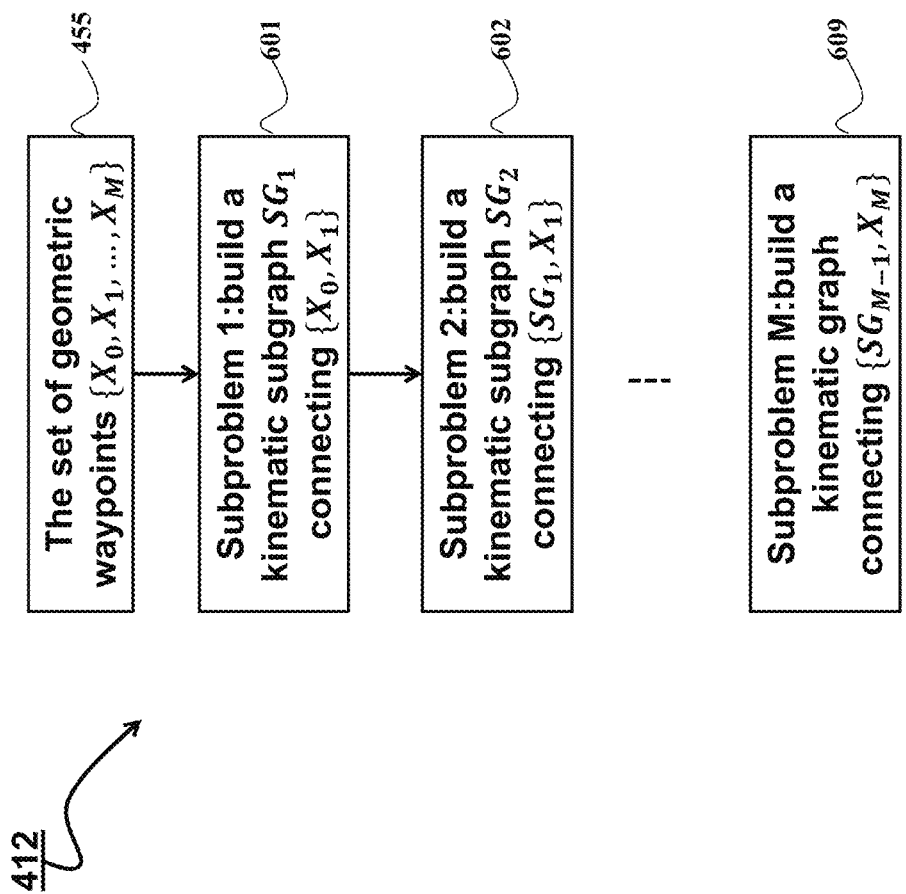
FIG. 6A is a block diagram of partitioning the planning problem into a set of subproblems using the kinematic path defined by a set of waypoints according to one embodiment.
Figure 6B:
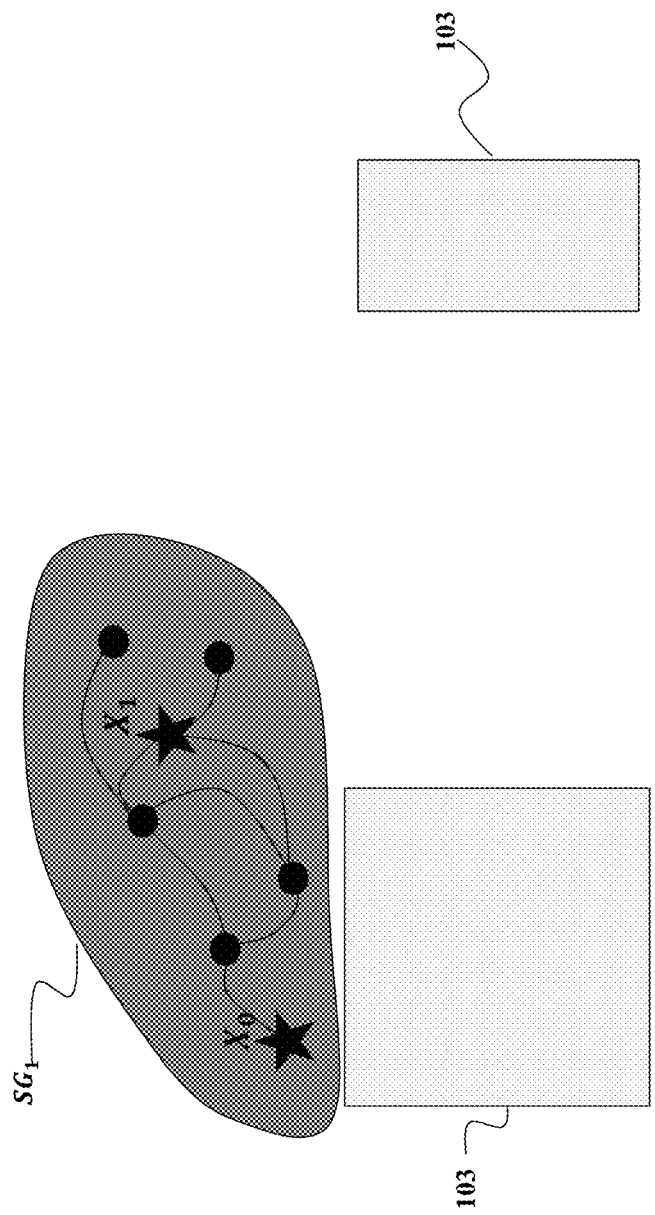
FIGS. 6B, 6C, and 6D are schematics of kinematic subgraphs constructed to address the set of subproblems of FIG. 6A.
Figure 6C:
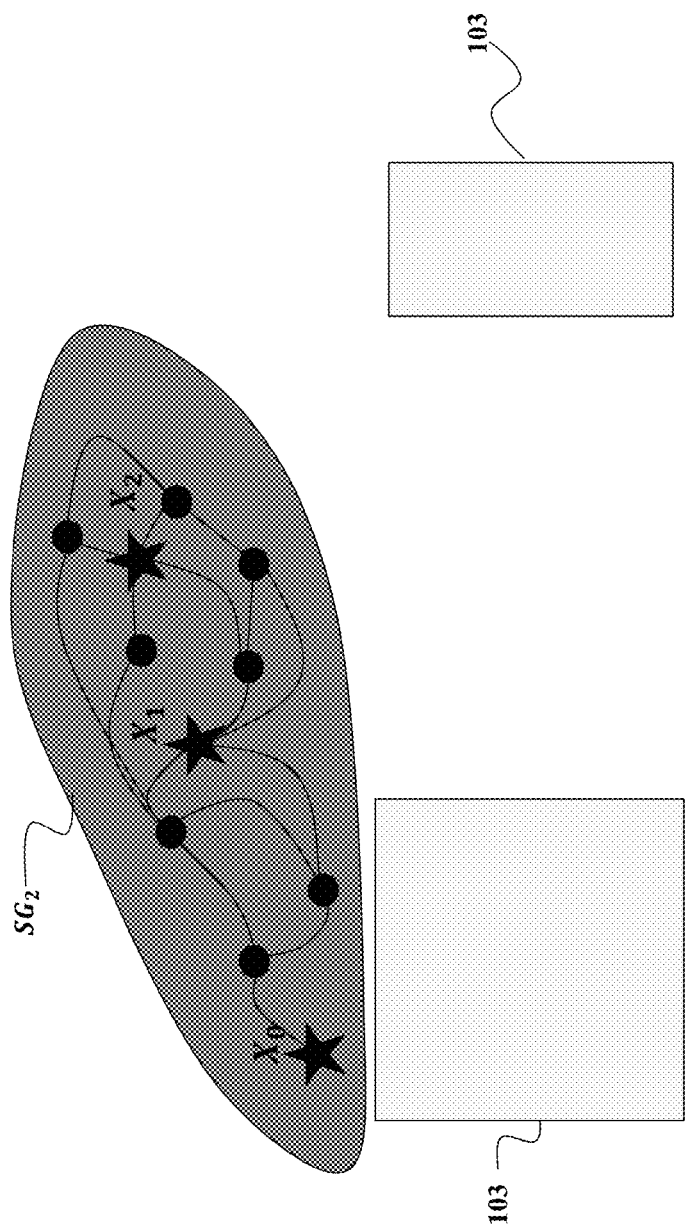
Figure 6D:
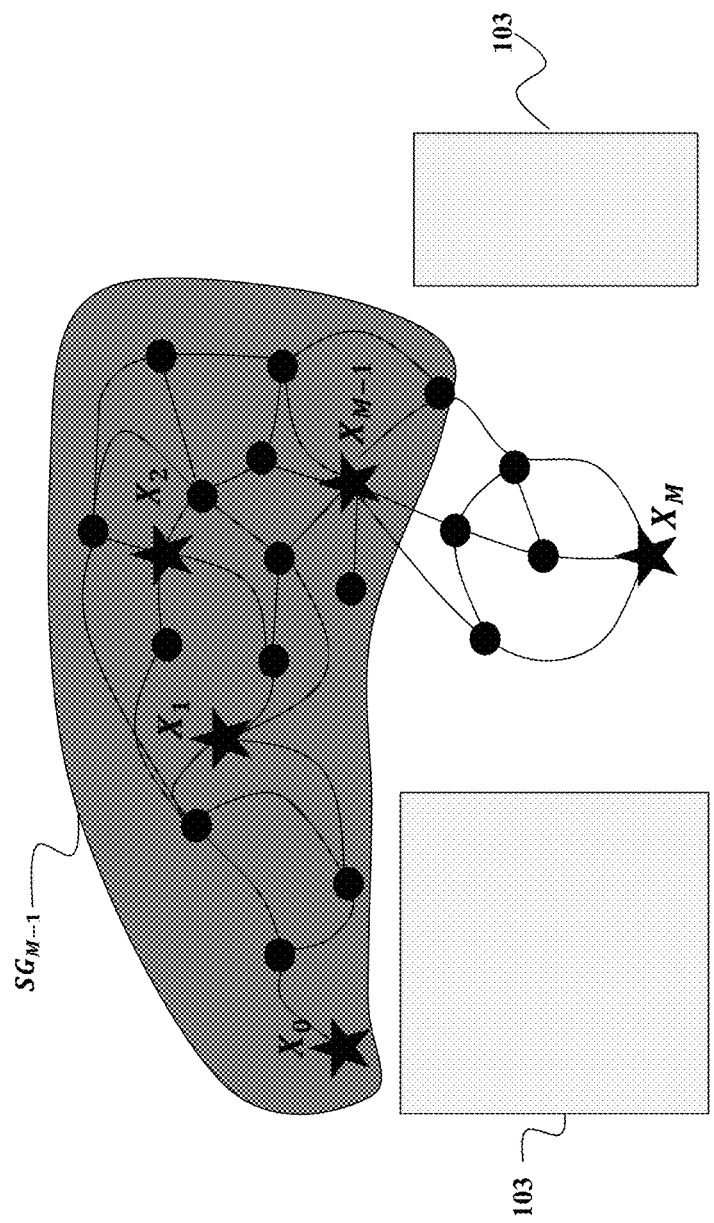

FIG. 6A shows a block diagram of partitioning the planning problem into a set of subproblems using the geometric path 455 defined by a set of waypoints according to one embodiment. FIGS. 6B, 6C, and 6D show a set of kinematic subgraphs constructed to address the set of subproblems of FIG. 6A. For example, a first subproblem 601 is defined as 'build a first kinematic subgraph $SG_1$ connecting $X_0$ and $X_1$, i.e., connecting an initial state with the second waypoint. FIG. 6B shows that the kinematic subgraph $SG_1$ is constructed to connect $X_0$ and $X_1$ kinematically.

The second subproblem 602 is defined as build a second kinematic subgraph $SG_2$ connecting the first kinematic subgraph $SG_1$ and $X_2$, i.e., connecting the second waypoint with the third waypoint. FIG. 6C shows that the kinematic subgraph $SG_2$ is constructed to connect $SG_1$ and $X_2$ kinematically. The final subproblem M 609 is defined as build a kinematic graph KG connecting $SG_{M-1}$ and $X_M'$. FIG. 6D shows the kinematic subgraph $SG_{M-1}$ and that the kinematic graph KG is constructed to connect $SG_{M-1}$ and $X_M$ kinematically. The aforementioned definition of subproblems can be run sequentially in a processor.

Figure 7A:
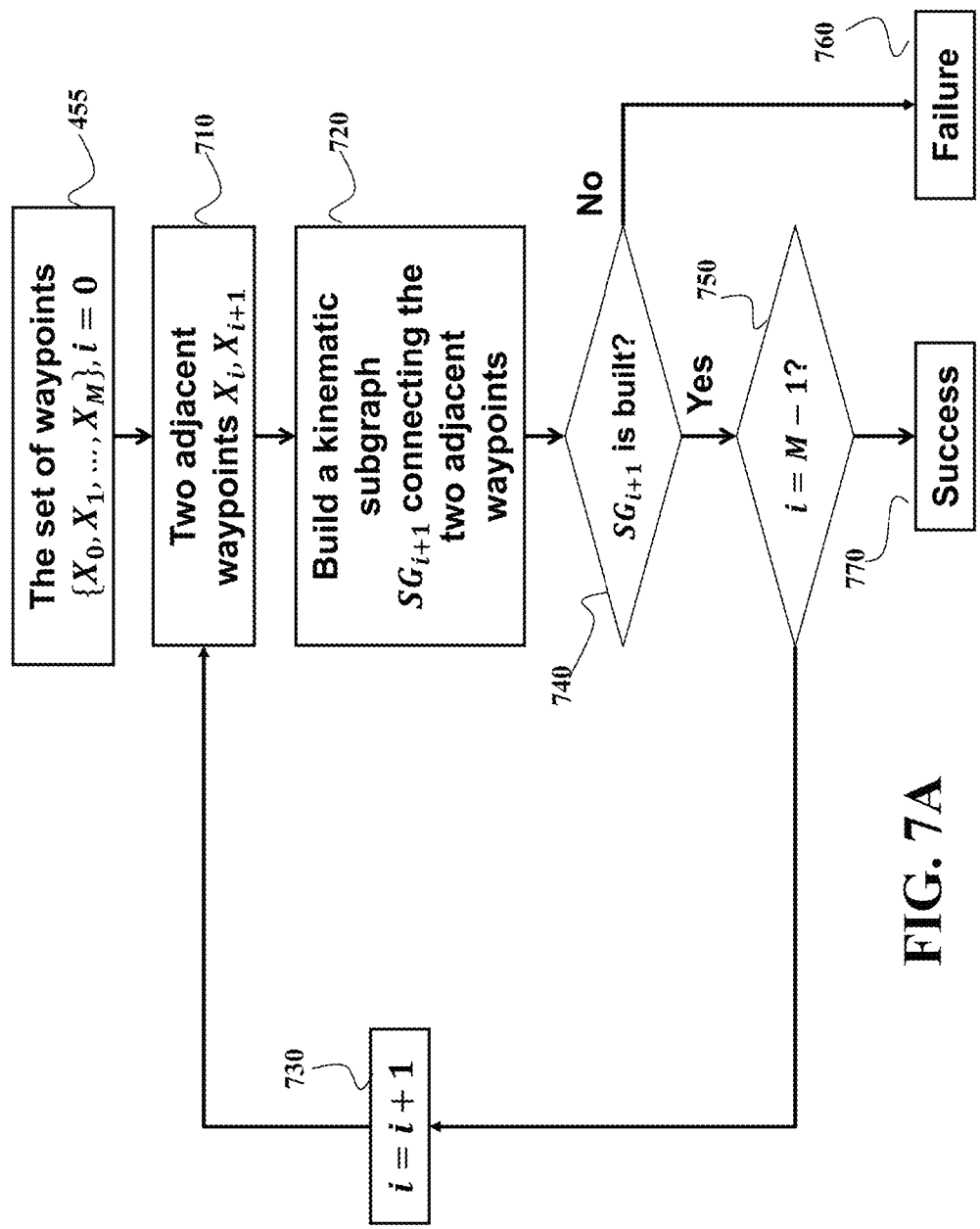
FIG. 7A is a block diagram of a method for sequentially solving subproblems according to one embodiment.

FIG. 7A shows a block diagram of a method for sequentially solving subproblems according to one embodiment. The method sequentially 730 builds 720 the kinematic graph 740 for each two adjacent waypoints 710 from the set 475. After the graphs 740 is built the method moves 750 to the next pair 710 until successful 770 or failure 760 termination condition is met.

Figure 7B:
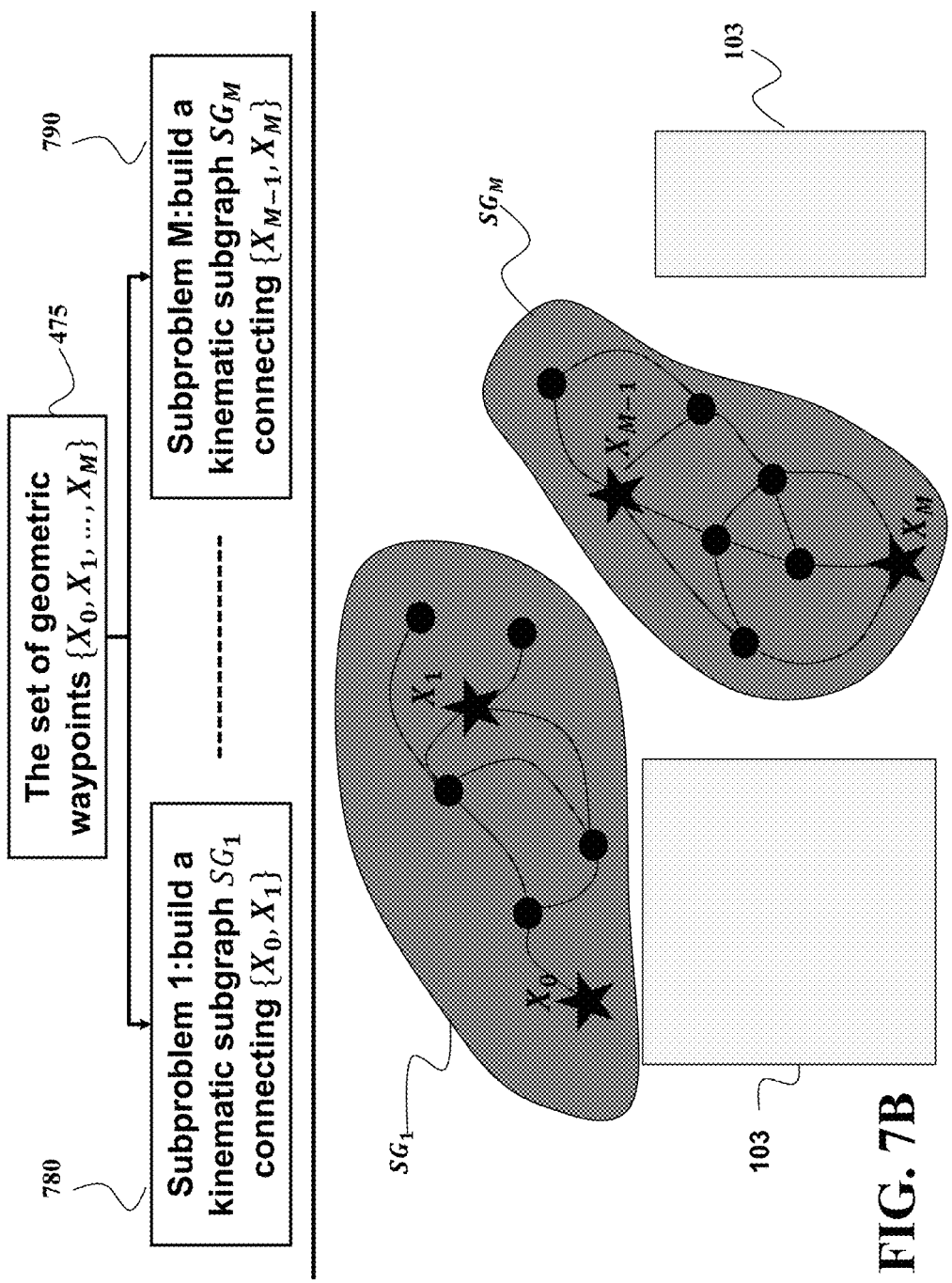
FIG. 7B is a schematic of an alternative embodiment of formulating subproblems using the set of waypoints.

FIG. 7B shows a schematic of an alternative embodiment of formulating subproblems using the set of waypoints. Subproblems 780 to 790 are defined as 'build a kinematic subgraph $SG_1, \ldots, SG_M$ which connects $\{X_0, X_1\}, \ldots, \{X_{M-1}, X_M\}$, respectively. As long as all subgraphs are connected, the kinematic graph is defined as a union of the subgraphs, and is connected. Subproblems in this embodiment can be solved in parallel.

Notably, because the neighboring waypoints are usually closer to each other than the initial and target state of the vehicle, the bias sampling of the parking space can be used to build each kinematic subgraph. To that end, each new sample of the state is more likely to be added to the one of the kinematic subtrees, and thus reduce the waste of computations.

Figure 8:
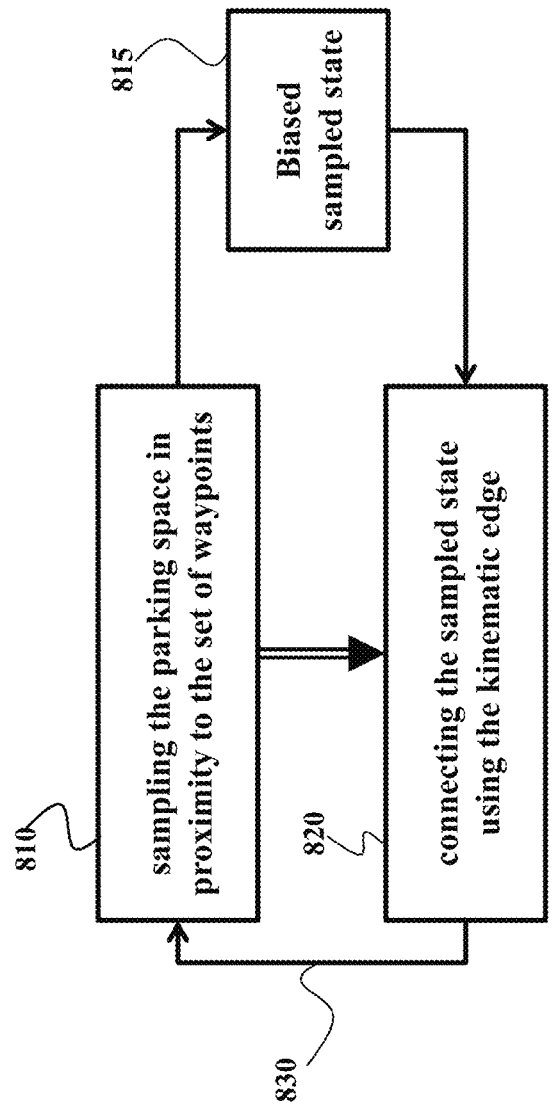
FIG. 8 is a block diagram of a method for determining the kinematic graph according to one embodiment.

FIG. 8 shows a block diagram of a method for determining the kinematic graph according to one embodiment. The method samples 810 the parking space in proximity to the set of waypoints to produce a sampled state 815. In such a manner the sampled state is biased to at least one state of the waypoints. For example, the sampling can be performed using a probability distribution of states of the parking space having a mean and a covariance as a function of the states of the waypoints.

The method connects 820 the sampled state with at least one tree starting from at least one waypoint using the kinematic edge to update the tree if the kinematic edge is collision free and repeats 830 the sampling and the connecting until a termination condition is met. For example, the termination condition can include one or combination of the formation of the connected geometric graph, a number of paths connecting the initial node and the target node on the kinematic graph is above a threshold, a number of nodes connecting trees of neighboring waypoints.

Figure 9A:
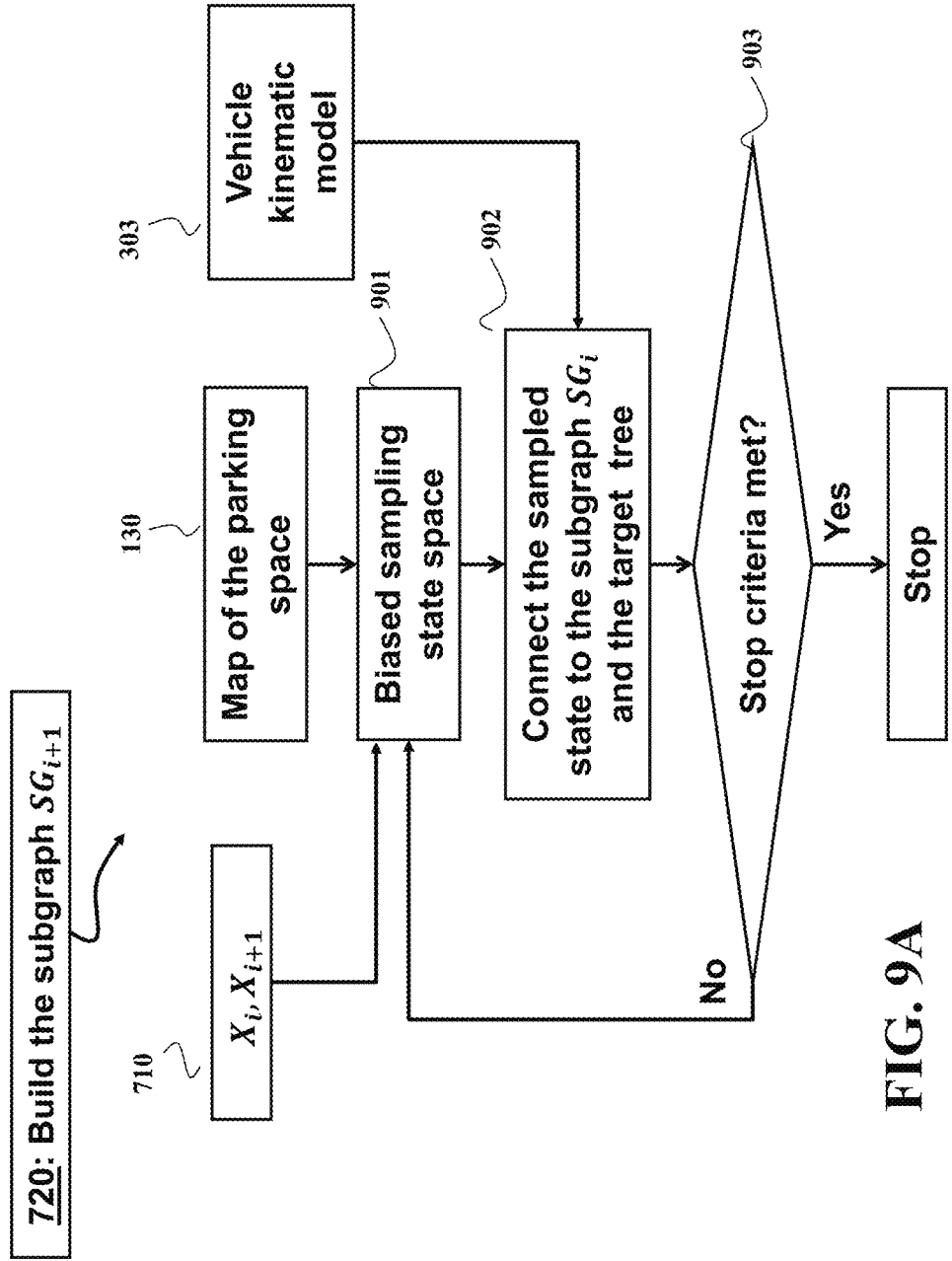
FIG. 9A is a block diagram of an exemplar method for solving a subproblem according to one embodiment.

FIG. 9A shows a block diagram of an exemplar method for solving a subproblem i+1 according to one embodiment. The subproblem i+1 compels to build 720 the kinematic subgraph $SG_{i+i}$ from the waypoint $X_i$ and $X_{i+1}$, the geometry of the parking space, and the vehicle kinematic model. The subgraph $SG_{i+i}$ is built to connect the subgraph $SG_i$ and $X_{i+1}$. For example, the subgraph $SG_i$ can be viewed as an initial kinematic tree where its root node corresponds to the state $X_0$. Being treated as a target state of the subproblem i+1, an target kinematic tree $KT_t$ is initialized with a root node having the state $X_{i+1}$. A biased sampling block 901 samples the state space $\chi$ according to a probability density function P(X), and returns a collision free state $X \in \chi$. A connecting block 902 makes connections between the sampled state and its nearest neighboring nodes located on the subgraph $SG_i$ and the kinematic target tree $KT_t$. The sampled state is added to the subgraph $SG_i$ only if it can be connected to its nearest node of the subgraph $SG_i$ with a kinematic edge without collision. Similarly, the sampled state is added to the kinematic target tree only if the sampled state can be connected to its nearest node of the tree with a kinematic edge without collision. Also, an edge connecting the neatest node and the node having the sampled state is added to the tree where the nearest node is located.

The aforementioned steps including biased sampling 901 and connecting 902 are repeated until certain stop criteria are met. In one embodiment, a criterion is when the sampled state X is added to both the subgraph $SG_i$ and the kinematic target tree. In another embodiment, a criterion is when the number of sampled states added to both the subgraph $SG_i$ and the kinematic target tree $KT_t$ exceeds a threshold.

Figure 9B:
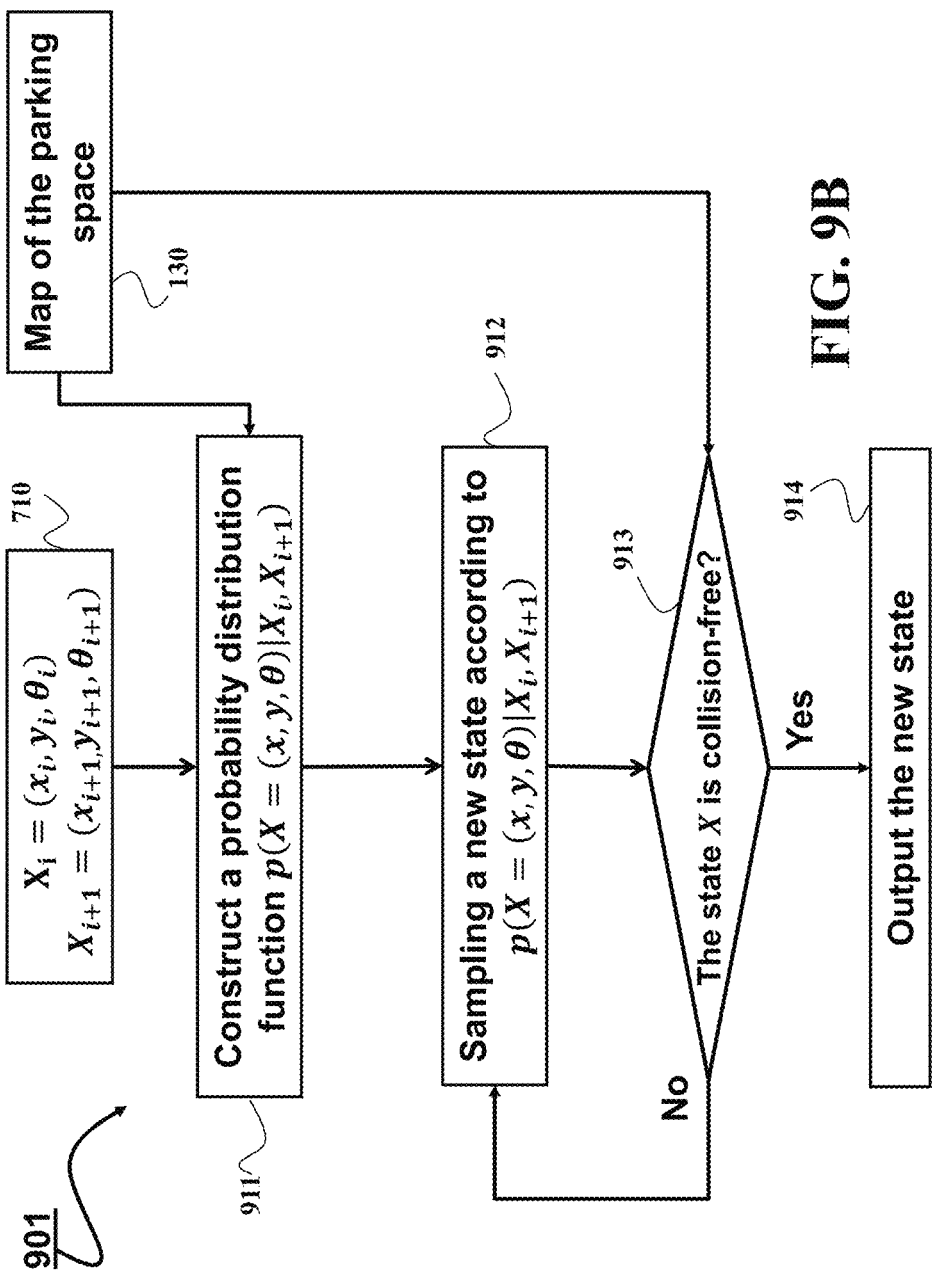
FIG. 9B is a block diagram of an implementation of the biased sampling according to one embodiment.

FIG. 9B gives a block diagram of an implementation of the biased sampling 901 according to one embodiment. The probability density function P(X) is first constructed 911 as a function of waypoints $X_1$ and $X_{i+1}$. In a block 912, a sampled state is generated in such a way that its probability density function matches P(X). The sampling 912 is repeated until 914 the sampled state is collision free 913.

For example, the sampling is performed using a probability distribution of states of the parking space having a mean and a covariance as a function of the states of the waypoints. In one embodiment, the probability distribution is Gaussian.

Figure 9C:
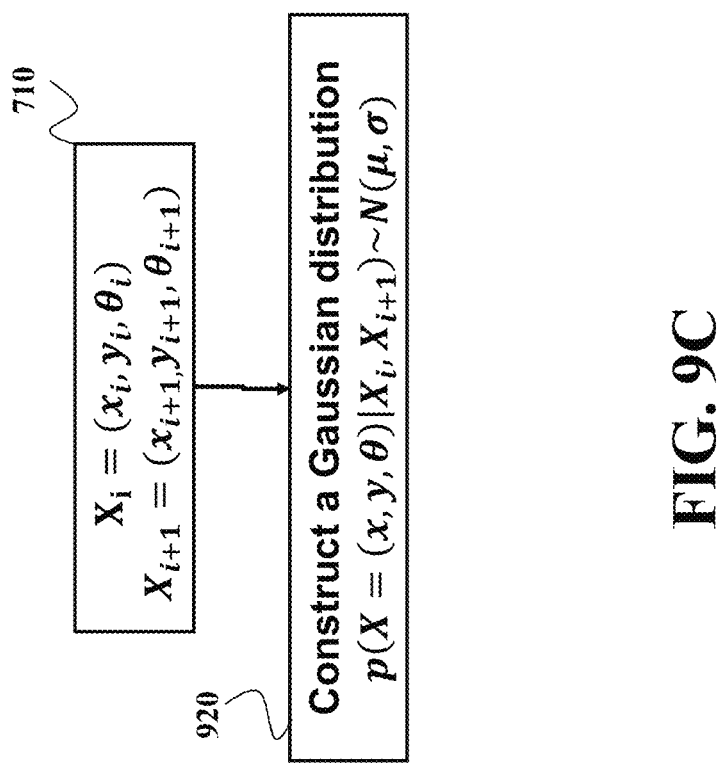
FIG. 9C is a block diagram of a method for biased sampling according to one embodiment.

FIG. 9C shows a block diagram of a method for biased sampling according to one embodiment using Gaussian probability density function P(X) 920 where its mean μ and covariance σ are functions of $X_1$ and $X_{i+1}$. Defining a scalar tuning parameter $0 \leq \lambda_\mu \leq 1$, the mean value of the Gaussian distribution is given by $$\mu = \lambda_\mu X_i + (1-\lambda_\mu) X_{i+1}.$$

A diagonal covariance matrix of Gaussian distribution is calculated as $\sigma = \text{diag}(\lambda_x \sigma_x, \lambda_y \sigma_y, \lambda_\theta \sigma_\theta)$ where $\sigma_x$, $\sigma_y$, $\sigma_\theta$ are determined by a formula $$[\sigma_x, \sigma_y, \sigma_\theta] = \text{dot}(X_i - \mu, X_i - \mu) + \text{dot}(X_{i+1} - \mu, X_{i+1} - \mu).$$

where $\text{dot}(x_1, x_2)$ represents a dot product of vectors $x_1$ and $x_2$, and $\lambda_x = \lambda_y > \lambda_\theta > 0$ are scaling parameters tuned for the probability density function to reflect certain criteria. In one embodiment, $\lambda_x = \lambda_y > \lambda_\theta > 0$ can be used to reflect human heuristics.

In another embodiment, the probability density function P(X) is Gaussian process where its mean μ and covariance σ are functions of a set of waypoints including $X_i$ and $X_{i+1}$.

Figure 10:
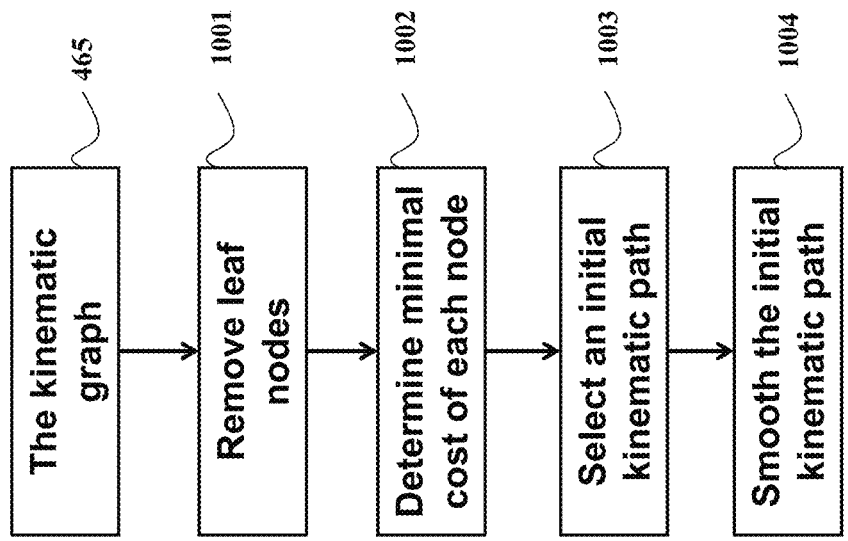
FIG. 10 is a block diagram of a method for selecting the kinematic path from the kinematic graph according to one embodiment.

FIG. 10 shows a block diagram of a method for selecting the kinematic path from the kinematic graph KG 465 according to one embodiment. The method 1001 trims the kinematic graph by removing all leaf nodes except the initial and target nodes, where a leaf node is connected to only one neighbor node with a kinematic edge. The method determines 1002 a minimal cost of each node by performing the value iteration, in the same manner as the geometric graph case, over the kinematic graph. Starting with the initial node, a block 1003 selects an initial kinematic path, according to the node cost and the kinematic graph. In one embodiment, the block 1003 selects an initial kinematic path using policy iteration as adopted in the selection of the best geometric path (equivalently the set of waypoints) from the geometric graph. For example, the initial kinematic path includes a set of nodes including the initial node and the target node. A block 1004 smoothes the initial kinematic path to produce a kinematic path which starts from the initial state and ends at the target state.

Figure 11A:
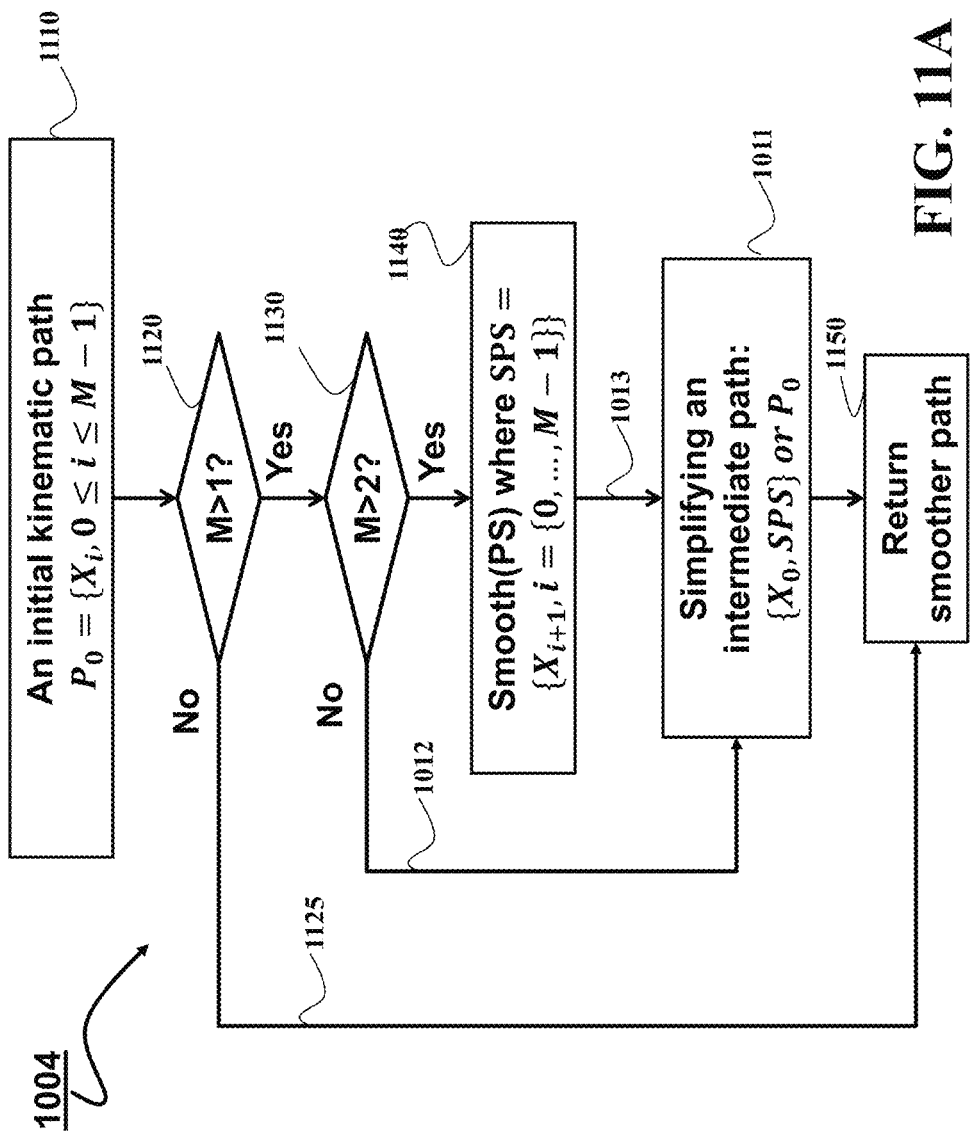
FIG. 11A is a flow chart for smoothing the initial kinematic path according to one embodiment.

FIG. 11A shows a flow chart for smoothing 1004 the initial kinematic path 1110 according to one embodiment. In some embodiments, the smoothing the kinematic path includes removing an intermediate waypoint that is not necessary for reaching a subsequent waypoint in the kinematic path. For example, given an initial kinematic path $P_0=\{X_0, \ldots, X_M\}$, the block 1004 does nothing, i.e., returns 1125 the path, if M≤1 1120. If M=2, an intermediate path is defined as the initial kinematic path $P_0$, labeled 1012. If M>2 1130, the block 1004 tries to smooth 1140 a subpath $PS=\{X_1, \ldots, X_M\}$ to produce a smoothed subpath SPS, and returns an intermediate path $\{X_0, SPS\}$, labeled 1013. A block 1011 simplifies the intermediate path, either $P_0$ or SPS, by trying making connection between $X_0$ and the rest nodes to produce the smoother path 1150.

Figure 11B:
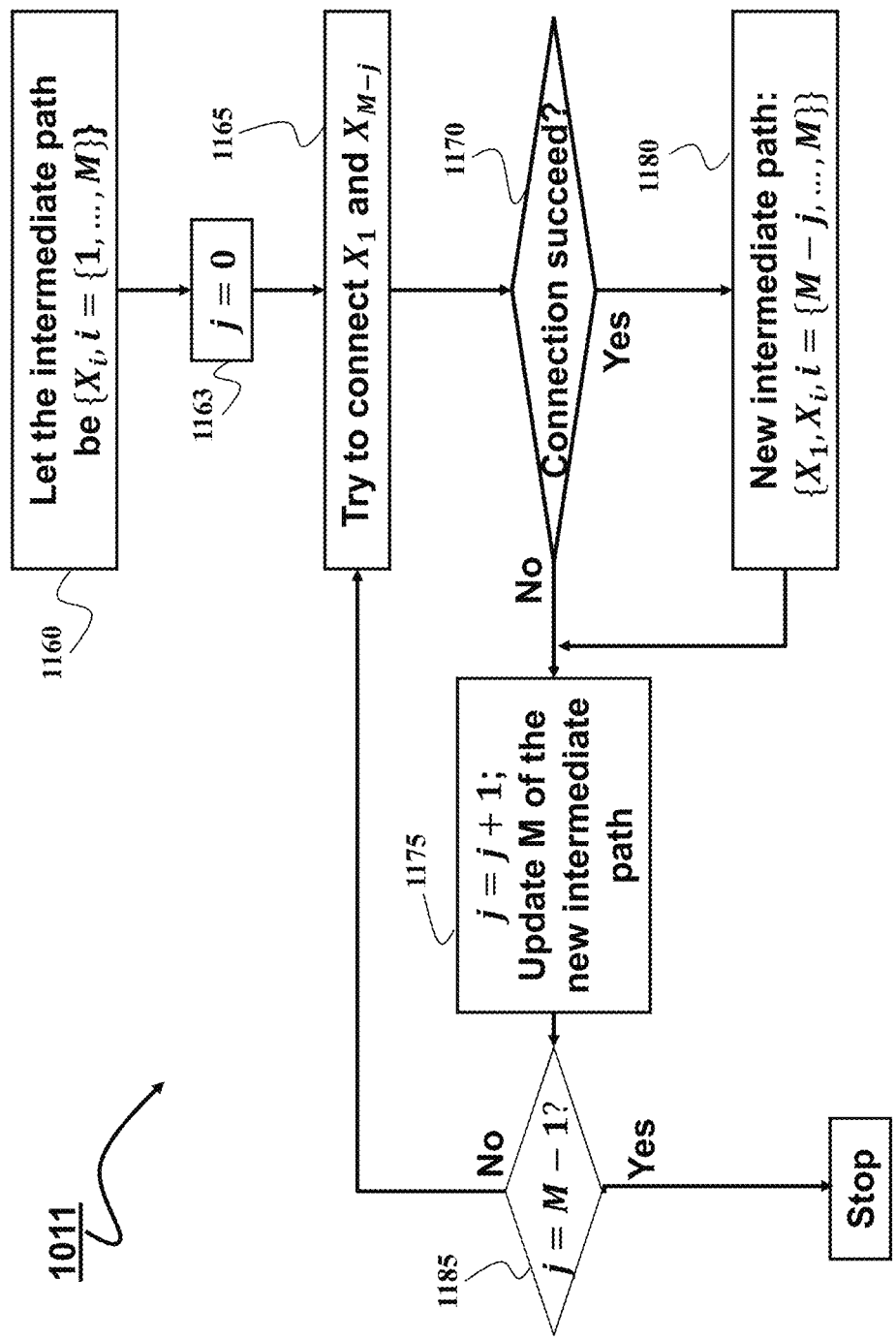
FIG. 11B is a flow chart for a method performed by a block of the flow chart of FIG. 11A according to one embodiment.

FIG. 11B shows a flow chart for a method performed by block 1011 the flow chart of FIG. 11A according to one embodiment. Let j be an indexing variable initialized as M. Block 1165 tries to connect $X_1$ and $X_j$ with a collision-free kinematic edge. If the connection is successful, the block 1180 outputs a new path consists of $\{X_1, X_i, M-j\le i\le M\}$; otherwise, j increases by 1. If j reaches M−1, the block 1011 stops and outputs the intermediate path $\{X_i, 1\le i\le M\}$, otherwise, new $X_j$ is provided to block 1165 for testing new connection.

Figure 11C:
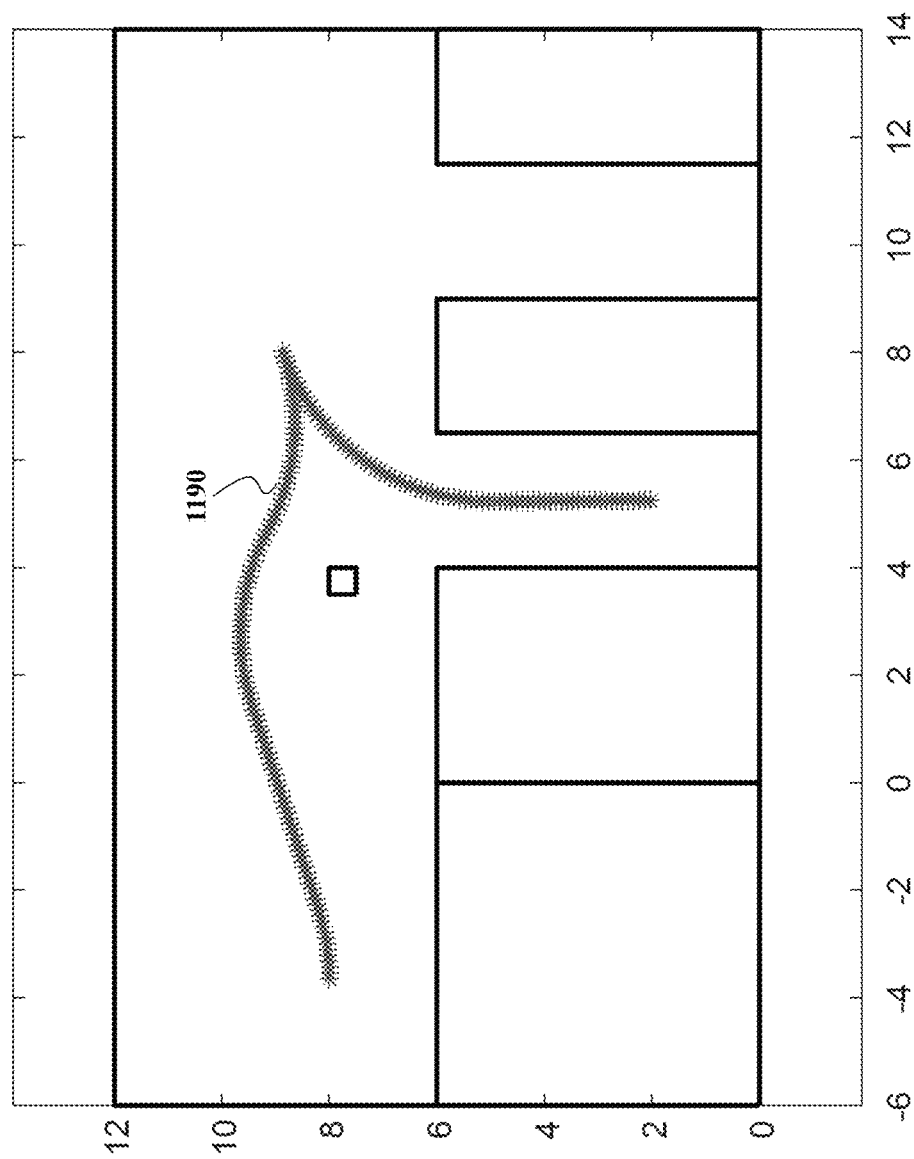
FIG. 11C is a plot a kinematic path for the parking scenario shown in FIG. 1A.
Figure 11D:
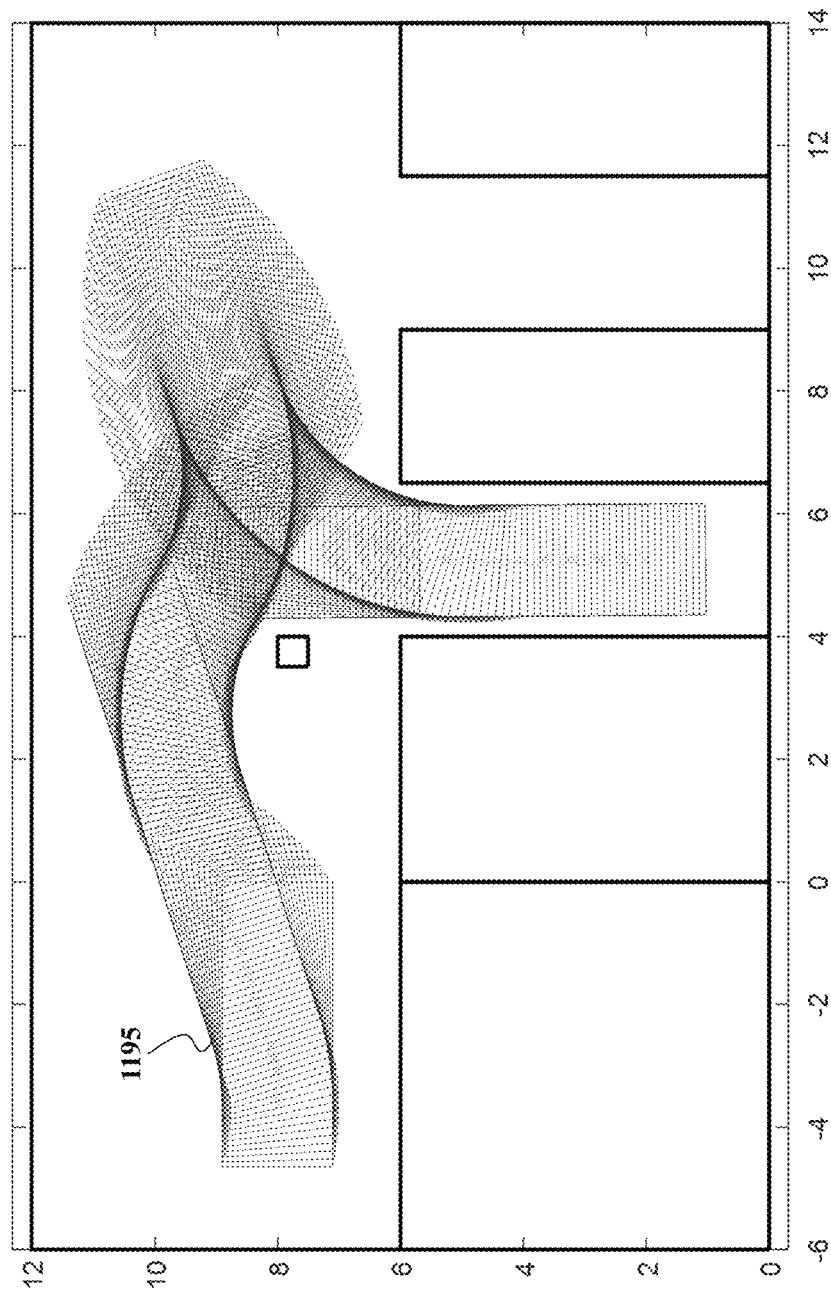
FIG. 11D is a plot illustrating the motion of the vehicle 100 along the kinematic path.

The block 1004 outputs a set of nodes that the kinematic path needs to pass in order to move the vehicle from the initial state $X_0$ to the target state $X_f$. The kinematic path can be generated by simulating the vehicle kinematic model with the initial value being the initial state, and velocity and steer angle as external inputs. The velocity and steer angle required to move the vehicle from $X_i$ to $X_j$, which are two adjacent nodes of the kinematic path, are obtained during the construction of the kinematic graph. Specifically, they are solved when connecting $X_i$ with $X_j$ through the edge $E(X_i, X_j)$, and are stored as the action codes in the edge $E(X_i, X_j)$. As an example, FIG. 11C plots a kinematic path 1190, computed in the smooth block 1004, for the parking scenario shown in FIG. 1A. FIG. 11D plots a schematic 1195 illustrating the motion of the vehicle 100 along the kinematic path 1190.

Some embodiments determine, using a dynamic model of the vehicle, a reference trajectory tracking the kinematic path as a function of time and control the motion of the vehicle according to the reference trajectory. However, the block 1004 can generate a kinematic path $X_k(t)$, $t\in[0, t_n]$ the does not satisfy the vehicle dynamics of model (1).

Figure 12:
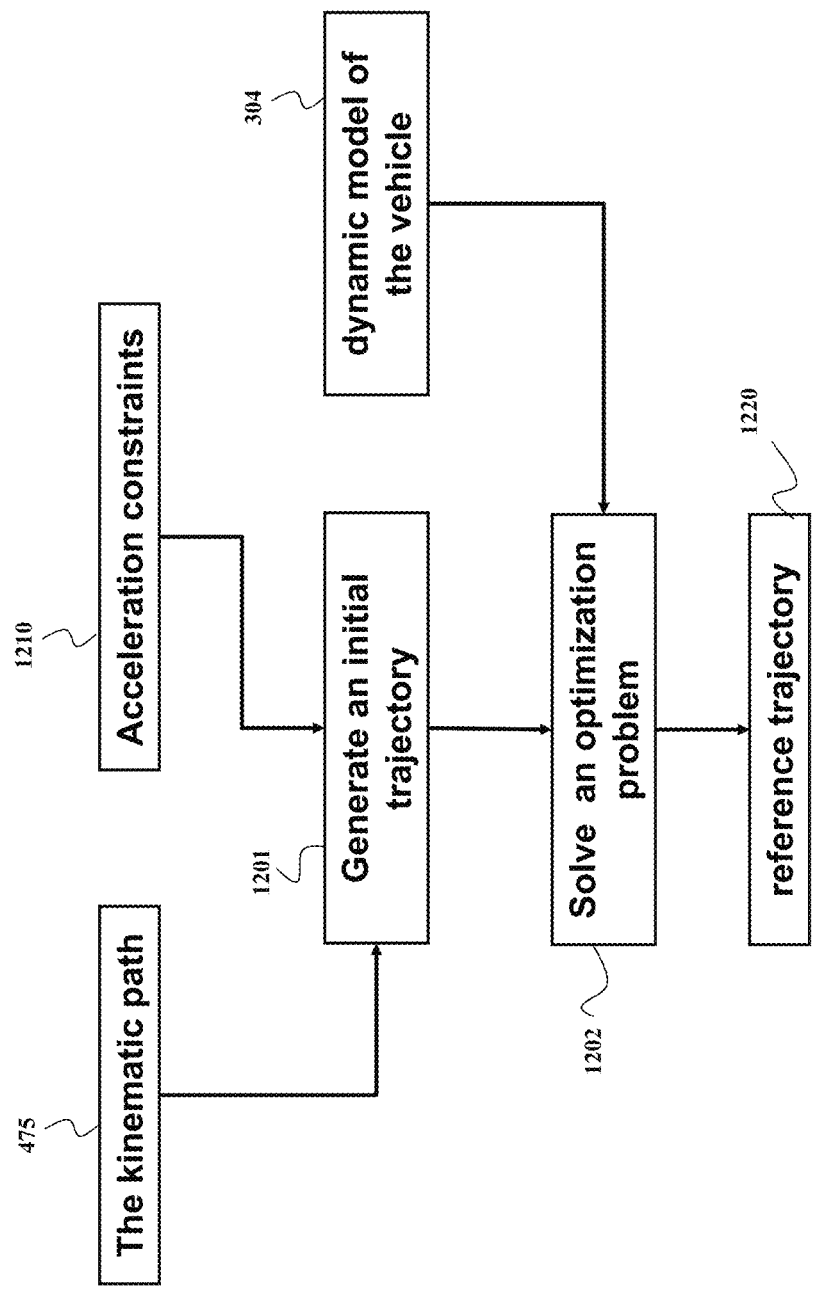
FIG. 12 is a block diagram of a method for further processing the kinematic path to generate the reference trajectory according to one embodiment.

FIG. 12 shows a block diagram of a method for further processing the kinematic path to generate the reference trajectory for real-time control purpose according to one embodiment. In a block 1201, an initial trajectory $X^0(t)$ is generated from the kinematic path and acceleration constraints 1210. A block 1202 generates the reference trajectory 1220 by solving the following optimal control problem $$\min_{a_1(t),a_2(t),t\in[0,t_n]} \int_0^{t_n} (X(t)-X_k(t))^T W(X(t)-X_k(t))\,dt$$

i. subject to $$|a_1(t)|\le a_{1max}$$

$$|a_2(t)|\le a_{2max}$$

$$X(0)=X_0, X(t_n)=X_f$$

$$|X(t)-X_k(t)|\le\epsilon, \quad (1)$$

where W is a positive definite matrix, $a_{1max}$ a maximum translational acceleration of the vehicle, $a_{2max}$ a maximum angular velocity of the steering wheel, and $\epsilon$ is a small positive scalar. The aforementioned optimal control problem is typically discretized in time and converted to a nonlinear optimization problem, which requires an initial guess to solve.

In one embodiment, the initial guess can be generated from the kinematic path $X_k(t)$ and inverting the vehicle dynamics (1). In another embodiment, boundary conditions $X(t_n)=X_f$ and $X(0)=X_0$ might be difficult to satisfy. It is advantageous to consider the following optimization problem $$\min_{a_1(t),a_2(t),t\in[0,t_n]} \Phi + \int_0^{t_n} (X(t)-X_k(t))^T W(X(t)-X_k(t))\,dt$$

subject to $$|a_1(t)|\le a_{1max}$$

$$|a_2(t)|\le a_{2max}$$

$$|X(t)-X_k(t)|\le\epsilon, \quad (1)$$

where $$\Phi(X(0), X_k(0), X(t_n), X_k(t_n)) = (X(0)-X_k(0))^T S_0(X(0)-X_k(0)) + (X(t_n)-X_k(t_n))^T S_n(X(t_n)-X_k(t_n)),$$

with $S_0$ and $S_n$ positive definite matrices.

In another embodiment, $t_n$, the time for the vehicle to move from $X_0$ to $X_f$, obtained during the computation of the kinematic path might be too tight to meet, and thus jeopardize the feasibility of the aforementioned optimization problems. One might generate the kinematic path, equivalently the initial trajectory, by relaxing $t_n$ to $(1+\alpha)t_n$ with $0<\alpha<\infty$.

Figure 13:
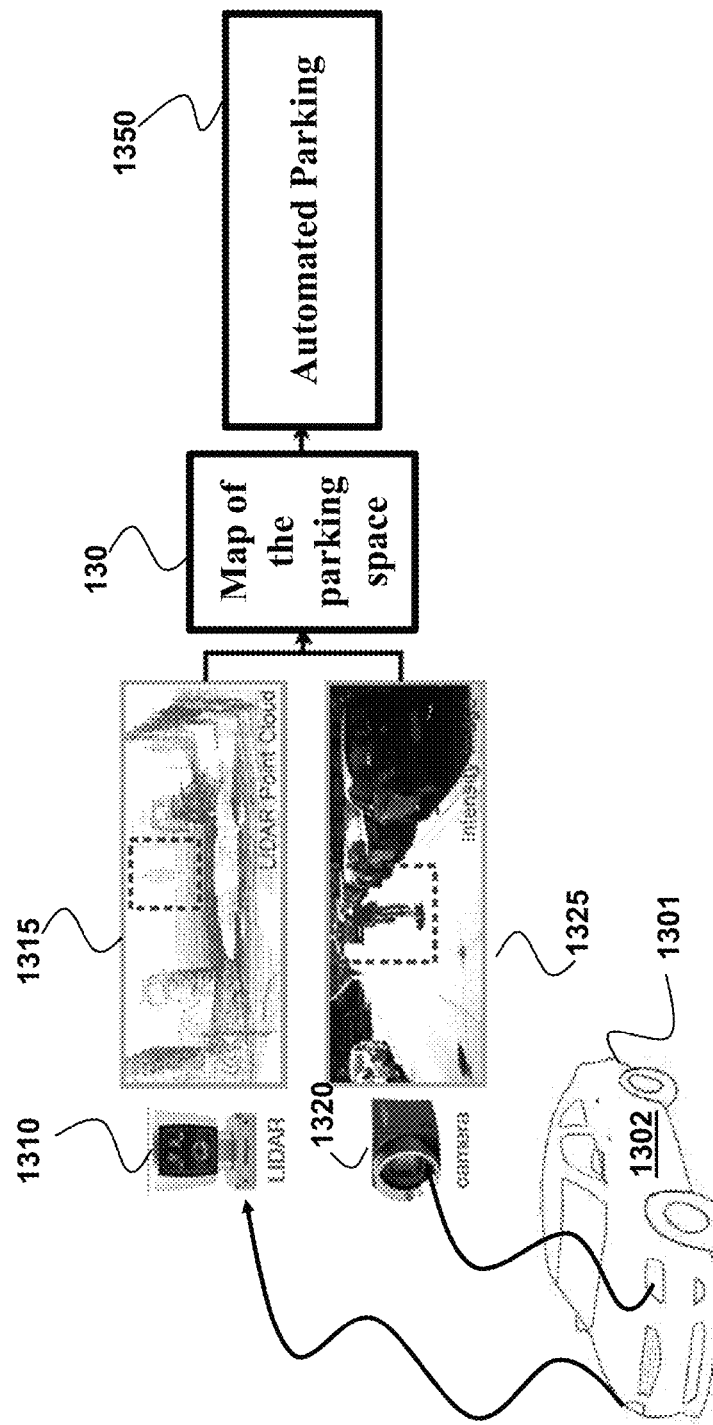
FIG. 13 is a schematic of a system according to one embodiment of the invention.

FIG. 13 shows a schematic of a system according to one embodiment. The system includes a vehicle 1301 including a processor 1302 configured for performing an automated parking 1350. The vehicle also includes at least one sensor, such as a LIDAR 1310 and/or a camera 1320. The LIDAR sensor 310 is the low-resolution first sensor and the camera 320 is the high-resolution second sensor. The sensor 1310 and/or 1320 is operatively connected to the processor 1302 and is configured for sensing information indicative of the geometry of at least part of the parking space. Using this information, the processor 1302 determines and/or updates the map of the parking space 130. To that end, the processor 1202 performs the automated parking 1350 using the map 130.

Figure 14:
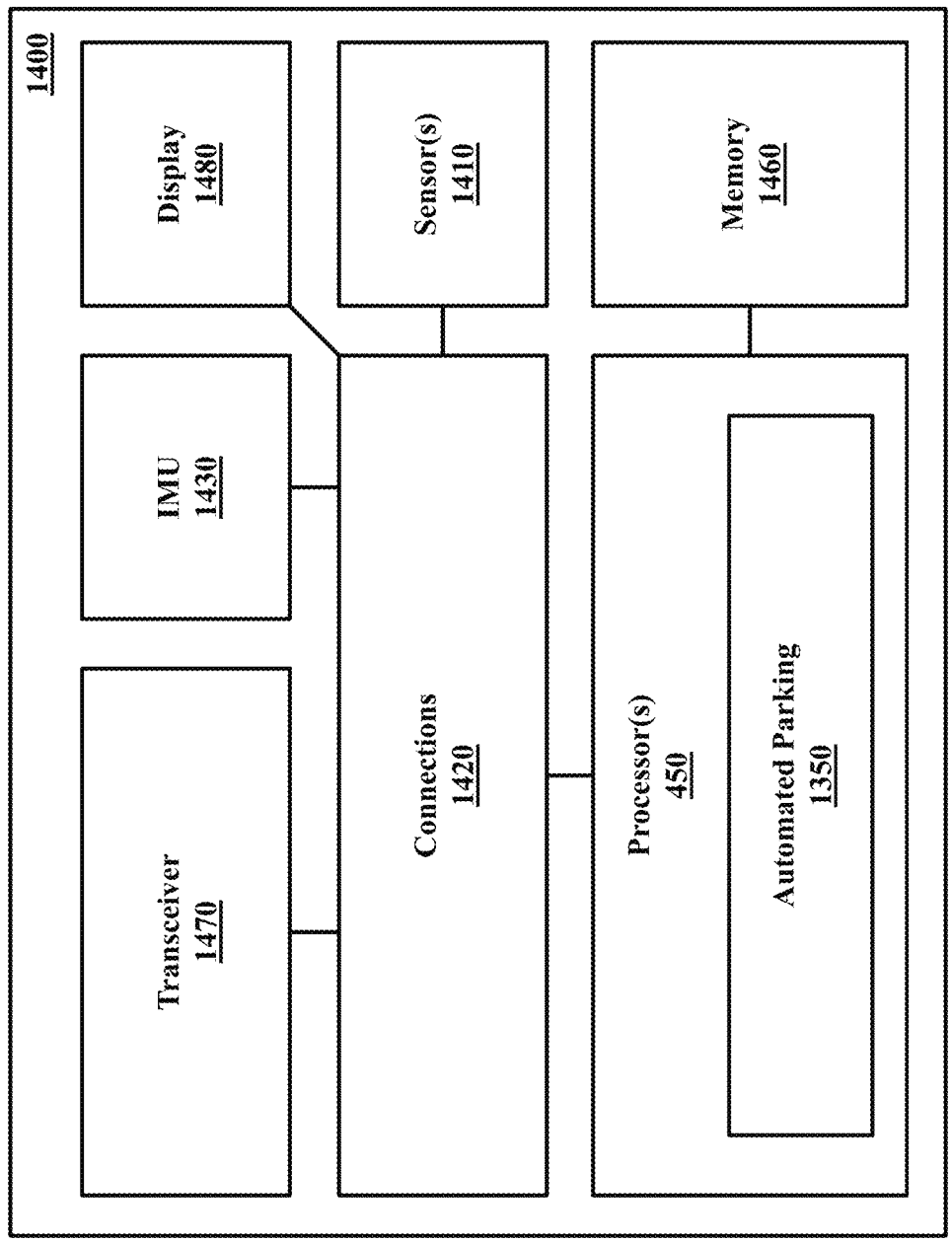
FIG. 14 is a block diagram of an automated parking system according to some embodiments.

FIG. 14 shows a block diagram of an automated parking system 1400 according to some embodiments. The system 1400 can be implemented internal to the vehicle 1301. Additionally, or alternatively, the system 1400 can be communicatively connected to the vehicle 1301.

The system 1400 can include one or combination of a camera 1410, an inertial measurement unit (IMU) 1430, a processor 1450, a memory 1460, a transceiver 1470, and a display/screen 1480, which can be operatively coupled to other components through connections 1420. The connections 1420 can comprise buses, lines, fibers, links or combination thereof.

The transceiver 1470 can, for example, include a transmitter enabled to transmit one or more signals over one or more types of wireless communication networks and a receiver to receive one or more signals transmitted over the one or more types of wireless communication networks. The transceiver 1470 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1400 can comprise image sensors such as CCD or CMOS sensors, lasers and/or camera 1410, which are hereinafter referred to as "sensor 1410". For example, the sensor 1410 can convert an optical image into an electronic or digital image and can send acquired images to processor 1450. Additionally, or alternatively, the sensor 1410 can sense the light reflected from a target object in a scene and submit the intensities of the captured light to the processor 1450.

For example, the sensor 1410 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1410 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1410. For example, in some embodiments, the sensor 1410 includes RGBD cameras, which may capture per-pixel depth (D) information when the depth sensor is enabled, in addition to color (RGB) images.

As another example, in some embodiments, the sensor 1410 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 1410. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1410 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1400 can be operatively connected to multiple sensors 1410, such as dual front cameras and/or a front and rear-facing cameras, which may also incorporate various sensors. In some embodiments, the sensors 1410 can capture both still and video images. In some embodiments, the sensor 1410 can include RGBD or stereoscopic video cameras capable of capturing images at, e.g., 30 frames per second (fps). In one embodiment, images captured by the sensor 1410 can be in a raw uncompressed format and can be compressed prior to being processed and/or stored in memory 1460. In some embodiments, image compression can be performed by the processor 1450 using lossless or lossy compression techniques.

In some embodiments, the processor 1450 can also receive input from IMU 1430. In other embodiments, the IMU 1430 can comprise 3-axis accelerometer(s), 3-axis gyroscope(s), and/or magnetometer(s). The IMU 1430 can provide velocity, orientation, and/or other position related information to the processor 1450. In some embodiments, the IMU 1430 can output measured information in synchronization with the capture of each image frame by the sensor 1410. In some embodiments, the output of the IMU 1430 is used in part by the processor 1450 to fuse the sensor measurements and/or to further process the fused measurements.

The system 1400 can also include a screen or display 1480 rendering images, such as color and/or depth images. In some embodiments, the display 1480 can be used to display live images captured by the sensor 1410, fused images, augmented reality (AR) images, graphical user interfaces (GUIs), and other program outputs. In some embodiments, the display 1480 can include and/or be housed with a touchscreen to permit users to input data via some combination of virtual keyboards, icons, menus, or other GUIs, user gestures and/or input devices such as styli and other writing implements. In some embodiments, the display 1480 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1480 or submitted to different applications that can be internal or external to the system 1400.

Exemplary system 1400 can also be modified in various ways in a manner consistent with the disclosure, such as, by adding, combining, or omitting one or more of the functional blocks shown. For example, in some configurations, the system 1400 does not include the IMU 1430 or the transceiver 1470. Further, in certain example implementations, the system 1400 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1450 can be implemented using a combination of hardware, firmware, and software. The processor 1450 can represent one or more circuits configurable to perform at least a portion of a computing procedure or process related to sensor fusion and/or methods for further processing the fused measurements. The processor 1450 retrieves instructions and/or data from memory 1460. The processor 1450 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1460 can be implemented within the processor 1450 and/or external to the processor 1450. As used herein the term "memory" refers to any type of long term, short term, volatile, nonvolatile, or other memory and is not to be limited to any particular type of memory or number of memories, or type of physical media upon which memory is stored. In some embodiments, the memory 1460 holds program codes that facilitate the automated parking.

For example, the memory 1460 can store the measurements of the sensors, such as still images, depth information, video frames, program results, as well as data provided by the IMU 1430 and other sensors. The memory 1460 can store a memory storing a geometry of the vehicle, a map of the parking space, a kinematic model of the vehicle, and a dynamic model of the vehicle. In general, the memory 1460 can represent any data storage mechanism. The memory 1460 can include, for example, a primary memory and/or a secondary memory. The primary memory can include, for example, a random access memory, read only memory, etc. While illustrated in FIG. 4 as being separate from the processors 1450, it should be understood that all or part of a primary memory can be provided within or otherwise co-located and/or coupled to the processors 1450.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1460 and/or the processor 1450.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A method for parking a vehicle within a parking space, wherein the method uses a processor coupled to a memory storing a geometry of the vehicle, a map of the parking space, a kinematic model of the vehicle, and a dynamic model of the vehicle, wherein the processor is coupled with stored instructions implementing the method, wherein the instructions, when executed by the processor carry out at least some steps of the method, comprising:
   determining, using the geometry of the vehicle and the map of the parking space, a collision free geometric path connecting an initial state of the vehicle with a target state of parked vehicle through a set of waypoints, each waypoint defines a position and orientation of the vehicle;
   determining, using a kinematic model of the vehicle, a set of kinematic subgraphs forming a kinematic graph having multiple nodes connected with kinematic edges, each kinematic subgraph connects a pair of neighboring waypoints of the geometric path, each node defines a state of the vehicle, and each kinematic edge connecting two nodes defines a collision free kinematic path connecting the two nodes according to kinematics of the vehicle;
   selecting, from the kinematic graph, a kinematic path connecting an initial node corresponding to the initial state of the vehicle with a target node corresponding to the target state of the vehicle through a set of intermediate nodes;
   determining, using a dynamic model of the vehicle, a reference trajectory tracking the kinematic path as a function of time; and
   controlling the motion of the vehicle according to the reference trajectory.

2. The method of claim 1, further comprising:
   growing the kinematic graph iteratively from a set of seeds corresponding to the set of waypoints.

3. The method of claim 1, further comprising:
   determining, using at least one sensor of the vehicle, the geometry of at least part of the parking space; and
   selecting the geometry of the vehicle from a memory, wherein the sensor and the memory are operatively connected to the processor.

4. The method of claim 1, wherein the determining the geometric path comprises:
   building a geometric graph connecting the initial node with the target node through a set of collision free nodes, each pair of nodes in the geometric graph is connected with a collision free edge determined using only geometry of the vehicle and the parking space; and
   selecting a set of nodes from the geometric graph forming the set of waypoints of the geometric path.

5. The method of claim 4, further comprising:
   sampling a point in the state space of the parking lot to produce a sampled state;
   rejecting the sampled state if all states of the nodes of the geometrical graph are within a non-reachable area of the sampled state; and otherwise determining a nearest node of the geometric graph having a state nearest to the sampled state;

adding a node for the sampled state to the geometric graph and connecting the added node with the nearest node via an edge if the edge is collision free; and repeating the sampling, the rejecting, the determining, and the adding until the initial node is connected to the target node.

6. The method of claim 5, wherein the geometric graph includes an initial tree starting from the initial node toward the target node and a target tree starting from the target node toward the initial nodes, and wherein the nearest node includes one or combination of a first nearest node from the initial tree and a second nearest node from the target tree.

7. The method of claim 4, further comprising:
determining for the initial node and each non-leaf node of the geometric graph a minimal cost of reaching the target node; and
selecting a set of nodes connecting the initial node with the target node with the minimal cost determined for the initial node to form the set of waypoints of the geometric path.

8. The method of claim 7, further comprising:
removing the leaf nodes except the initial node and the target node from the geometric graph; and
removing the edges connecting the removed leaf nodes from the geometric graph.

9. The method of claim 1, wherein the determining the kinematic graph comprises:
sampling the parking space in proximity to the set of waypoints to produce a sampled state;
connecting the sampled state with at least one tree starting from at least one waypoint using the kinematic edge to update the tree if the kinematic edge is collision free; and
repeating the sampling and the connecting until a termination condition is met, wherein the termination condition includes one or combination of the formation of the connected geometric graph, a number of paths connecting the initial node and the target node on the kinematic graph is above a threshold, a number of nodes connecting trees of neighboring waypoints.

10. The method of claim 9, wherein the sampling is performed biasedly using a probability distribution of states of the parking space having a mean and a covariance as a function of the states of the waypoints.

11. The method of claim 9, further comprising:
selecting two adjacent waypoints $X_i$, $X_{i+1}$ from the set of waypoints $X_0, \ldots, X_M$;
forming a subgraph $SG_{i+1}$ which connects a subgraph $SG_i$ to the waypoint $X_{i+1}$ through a set of collision-free nodes and kinematic edges, wherein $SG_i$ is the subgraph determined during a previous iteration for two adjacent waypoints $X_{i-1}$, $X_1$; and
repeating the selecting and the forming for $0 \leq i \leq M-1$.

12. The method of claim 11, further comprising
initializing the subgraphs using an initial tree and a target tree wherein the start tree includes the subgraph $SG_i$ including nodes corresponding to geometric waypoints $\{X_0, \ldots, X_i\}$, and the target tree includes the node corresponding to the waypoint $X_{i+1}$;
sampling biasedly a new state X from the state space of the vehicle kinematic model in proximity to waypoints $X_i$, $X_{i+1}$;
adding the new state X to at least one of the initial tree and the target tree if the vehicle can follow a collision-free kinematic path from the new state to a state in the initial tree and the target tree;
repeating the sampling and adding until the new state X is added to both the initial tree and the target tree.

13. The method of claim 12, further comprising
constructing a probability distribution function $P(X|X_i, X_{i+1})$ according to the waypoints $X_i$, $X_{i+1}$ and the geometry of the vehicle and the parking space;
sampling the new state X from the state space according to the probability distribution function $P(X|X_i, X_{i+1})$; and
repeating the sampling until the sampled state is collision-free.

14. The method of claim 1, further comprising
determining optimal cost of each node of the kinematic graph, wherein the optimal cost of a node represents a best estimated cost of moving the vehicle from the node to the target node through edges of the kinematic graph; and
determining by policy iteration the initial kinematic path represented by a set of kinematic waypoints and associated edges connecting the initial state with the target state.

15. The method of claim 14, further comprising:
initializing the initial kinematic path $P_0$ to include a current state $X_c$ as an initial state $X_0$ of the first kinematic waypoint;
determining a next state Xn of the current state such that an edge E(Xc, Xn) between the next state and the current state produce the minimum cost from the current state to the target state;
adding the next state Xn and the edge E(Xc,Xn) to the initial kinematic path P0={P0,Xn,E(Xc,Xn)}; and
repeating the determining and adding until the next state if the target state.

16. The method of claim 1, further comprising:
smoothing the kinematic path by removing an intermediate waypoint that is not necessary for reaching a subsequent waypoint in the kinematic path.

17. A system for parking a vehicle within a parking space, comprising:
a memory storing a geometry of the vehicle, a map of the parking space, a kinematic model of the vehicle, and a dynamic model of the vehicle;
a sensor operatively for sensing information indicative of the geometry of at least part of the parking space; and
a processor coupled to the memory and configured for
determining, using the geometry of the vehicle and the map of the parking space, a collision free geometric path connecting an initial state of the vehicle with a target state of parked vehicle through a set of waypoints, each waypoint defines a position and orientation of the vehicle;
determining, using a kinematic model of the vehicle, a set of kinematic subgraphs grown from a set of seeds corresponding to the set of waypoints to form a kinematic graph having multiple nodes connected with kinematic edges, each kinematic subgraph connects a pair of neighboring waypoints of the geometric path, each node defines a state of the vehicle, and each kinematic edge connecting two nodes defines a collision free kinematic path connecting the two nodes according to kinematics of the vehicle;
selecting, from the kinematic graph, a kinematic path connecting an initial node corresponding to the initial state of the vehicle with a target node corresponding to the target state of the vehicle through a set of intermediate nodes; and determining, using a dynamic model of the vehicle, a reference trajectory tracking the kinematic path as a function of time; and a controller for controlling the motion of the vehicle according to the reference trajectory.

18. The system of claim 17, wherein the processor determines the geometric path by building a geometric graph connecting the initial node with the target node through a set of collision free nodes, each pair of nodes in the geometric graph is connected with a collision free edge determined using only geometry of the vehicle and the parking space and by selecting a set of nodes from the geometric graph forming the set of waypoints of the geometric path.

19. The system of claim 17, wherein the processor is configured for sampling a point in the state space of the parking lot to produce a sampled state, wherein the sampling is performed biasedly using a probability distribution of states of the parking space having a mean and a covariance as a function of the states of the waypoints;

rejecting the sampled state if all states of the nodes of the geometrical graph are within a non-reachable area of the sampled state; and otherwise determining a nearest node of the geometric graph having a state nearest to the sampled state;

adding a node for the sampled state to the geometric graph and connecting the added node with the nearest node via an edge if the edge is collision free; and repeating the sampling, the rejecting, the determining, and the adding until the initial node is connected to the target node.

20. A non-transitory computer readable storage medium embodied thereon a program executable by a processor for performing a method, the method comprising:

determining a geometric path connecting an initial state of the vehicle with the target state of the vehicle without collision, wherein the geometric path includes a set of waypoints, each waypoint is defined by a position and orientation of the vehicle, and wherein the geometric path is determined using only geometry of the vehicle and the parking space;

determining a kinematic graph having multiple nodes connected with kinematic edges, each node defines a state of the vehicle and each kinematic edge connecting two nodes defines a collision free kinematic path between the two nodes, wherein the nodes of the kinematic graph is grown iteratively from a set of seeds corresponding to the set of waypoints, and wherein the kinematic edge connects two nodes according to kinematics of the vehicle;

selecting, from the kinematic graph, a kinematic path connecting an initial node corresponding to the initial state of the vehicle with a target node corresponding to the target state of the vehicle through a set of intermediate nodes;

determining a reference trajectory tracking the kinematic path, wherein the reference trajectory is a function of time; and controlling the motion of the vehicle according to the reference trajectory.

\* \* \* \* \*